United States Patent
Yamada

(10) Patent No.: US 9,424,207 B2
(45) Date of Patent: Aug. 23, 2016

(54) INFORMATION PROCESSING DEVICE, PROGRAM, INFORMATION PROCESSING METHOD, AND INFORMATION PROCESSING SYSTEM

(75) Inventor: Kazuko Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/125,633

(22) PCT Filed: Jun. 12, 2012

(86) PCT No.: PCT/JP2012/003824
§ 371 (c)(1),
(2), (4) Date: Dec. 12, 2013

(87) PCT Pub. No.: WO2012/176398
PCT Pub. Date: Dec. 27, 2012

(65) Prior Publication Data
US 2014/0108677 A1   Apr. 17, 2014

(30) Foreign Application Priority Data
Jun. 24, 2011   (JP) ................. 2011-140314

(51) Int. Cl.
*G06F 3/00* (2006.01)
*H04H 40/00* (2009.01)
*G06F 13/10* (2006.01)
*H04L 12/28* (2006.01)

(52) U.S. Cl.
CPC ............ *G06F 13/10* (2013.01); *H04L 12/2807* (2013.01)

(58) Field of Classification Search
CPC .......................... H04L 12/2807; H04L 41/12
See application file for complete search history.

(56) References Cited

U.S. PATENT DOCUMENTS

2008/0242222 A1*   10/2008   Bryce et al. ................. 455/3.06

FOREIGN PATENT DOCUMENTS

| EP | 1873958 A1 | 1/2008 |
|---|---|---|
| JP | 3740330 | 2/2006 |
| JP | 2009-009204 | 1/2009 |
| JP | 2010-130539 | 6/2010 |
| WO | 2006/054223 A1 | 5/2006 |

OTHER PUBLICATIONS

Alan Simpson, Alan Simpson's Windows XP Bible, 2001, Hungry Minds.*
European supplementary search report issued on Jan. 20, 2015 in patent application No. 12802205.0.

* cited by examiner

*Primary Examiner* — Hyun Nam
(74) *Attorney, Agent, or Firm* — Chip Law Group

(57) ABSTRACT

Consistent with embodiments of this disclosure, an information processing apparatus is provided. The information processing apparatus comprises an input terminal configured to receive a plurality of Universal Plug and Play (UPnP) descriptions from a plurality of external devices. The UPnP descriptions comprise grouping information indicating one or more groups to which the external devices belong. The information processing apparatus further comprises a processing unit configured to process the UPnP descriptions and assign the external devices to the one or more groups based on the grouping information.

20 Claims, 20 Drawing Sheets

| Device ID | UUID | Friendly Name | IP Address |
|---|---|---|---|
| D0 | uuid:34567812-1234-2020-6000-52540054321 | Device | 192.168.1.2 |
| D11 | uuid:12345678-1234-1010-8000-525400654321 | Device-A1 | 192.168.1.3 |
| D12 | uuid:23456783-1264-1040-7000-525400543216 | Device-A2 | 192.168.1.4 |
| D21 | uuid:23456783-1264-1040-6000-525400541219 | Device-B1 | 192.168.1.6 |
| : | : | : | : |

DEVICE TABLE

| Group ID | Group Name |
|---|---|
| G0 | root |
| G1 | GroupA |
| G2 | GroupB |
| : | : |

G0 --→ GROUP FOR SUPERUSER

GROUP TABLE

| Device ID | Group ID |
|---|---|
| D0 | G0 |
| D11 | G1 |
| D12 | G1 |
| D21 | G2 |
| : | : |

DEVICE-GROUP TABLE

| Object ID | Creator ID | Title | Class | URI |
|---|---|---|---|---|
| C1 | D0 | Container for GroupA | Object.container.storageFolder | ... |
| P1 | D11 | Exercise1 | object.item.imageItem.photo | ... |
| W1 | D12 | Exercise2 | object.item.docItem.XXXXXX | ... |
| A1 | D21 | Exercise3 | object.item.audioItem.musicTrack | ... |
| : | : | : | : | : |

OBJECT TABLE

OBJECT-GROUP TABLE

Fig. 10A

```
01 | <?xml version="1.0"?>
02 | <root xmlns="urn:schemas-upnp-org:device-1-0">
03 |   <specVersion>
04 |     <major>1</major>
05 |     <minor>0</minor>
06 |   </specVersion>
07 |   <URLBase>base URL for all relative URLs</URLBase>
08 |   <device>
09 |     <deviceType>
10 |     urn:schemas-upnp-org:device:MediaRenderer:1
11 |     </deviceType>
12 |     <friendlyName>Device-A1</friendlyName>
13 |     <manufacturer>manufacturer name</manufacturer>
14 |     <manufacturerURL>URL to manufacturer site</manufacturerURL>
15 |     <modelDescription>long user-friendly title</modelDescription>
16 |     <modelName>model name</modelName>
17 |     <modelNumber>model number</modelNumber>
18 |     <modelURL>URL to model site</modelURL>
19 |     <serialNumber>manufacturer's serial number</serialNumber>
20 |     <UDN>uuid:12345678-1234-1010-8000-525400654321</UDN>
21 |     <UPC>Universal Product Code</UPC>
22 |     <iconList>
23 |       <icon>
24 |         <mimetype>image/format</mimetype>
25 |         <width>horizontal pixels</width>
26 |         <height>vertical pixels</height>
27 |         <depth>color depth</depth>
28 |         <url>URL to icon</url>
29 |       </icon>
30 |       XML to declare other icons, if any, go here
31 |     </iconList>
32 |     <serviceList>
33 |       <service>
34 |         <serviceType>
35 |         urn:schemas-upnp-org:service:RenderingControl:1
36 |         </serviceType>
37 |         <serviceId>
38 |         urn:upnp-org:serviceId:RenderingControl
39 |         </serviceId>
40 |         <SCPDURL>URL to service description</SCPDURL>
41 |         <controlURL>URL for control</controlURL>
42 |         <eventSubURL>URL for eventing</eventSubURL>
43 |       </service>
```

EXAMPLE OF DEVICE DESCRIPTION (1/2)

Fig. 10B

```
44 |    <service>
45 |      <serviceType>
46 |      urn:schemas-upnp-org:service:ConnectionManager:1
47 |      </serviceType>
48 |      <serviceId>
49 |      urn:upnp-org:serviceId:ConnectionManager
50 |      </serviceId>
51 |      <SCPDURL>URL to service description</SCPDURL>
52 |      <controlURL>URL for control</controlURL>
53 |      <eventSubURL>URL for eventing</eventSubURL>
54 |    </service>
55 |    <service>
56 |      <serviceType>
57 |      urn:schemas-upnp-org:service:AVTransport:1
58 |      </serviceType>
59 |      <serviceId>urn:upnp-org:serviceId:AVTransport</serviceId>
60 |      <SCPDURL>URL to service description</SCPDURL>
61 |      <controlURL>URL for control</controlURL>
62 |      <eventSubURL>URL for eventing</eventSubURL>
63 |    </service>
64 |    Declarations for other services added by UPnP vendor
65 |    (if any) go here
66 |    </serviceList>
67 |    <av:group xmlns:av="urn:schemas-XXX-com:av">GroupA</av:group>
68 |    <deviceList>
69 |    Description of embedded devices added by UPnP vendor
70 |    (if any) go here
71 |    <deviceList/>
72 |    <presentationURL>URL for presentation</presentationURL>
73 |  </device>
74 | </root>
```

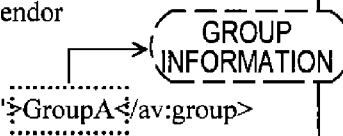
GROUP INFORMATION

EXAMPLE OF DEVICE DESCRIPTION (2/2)

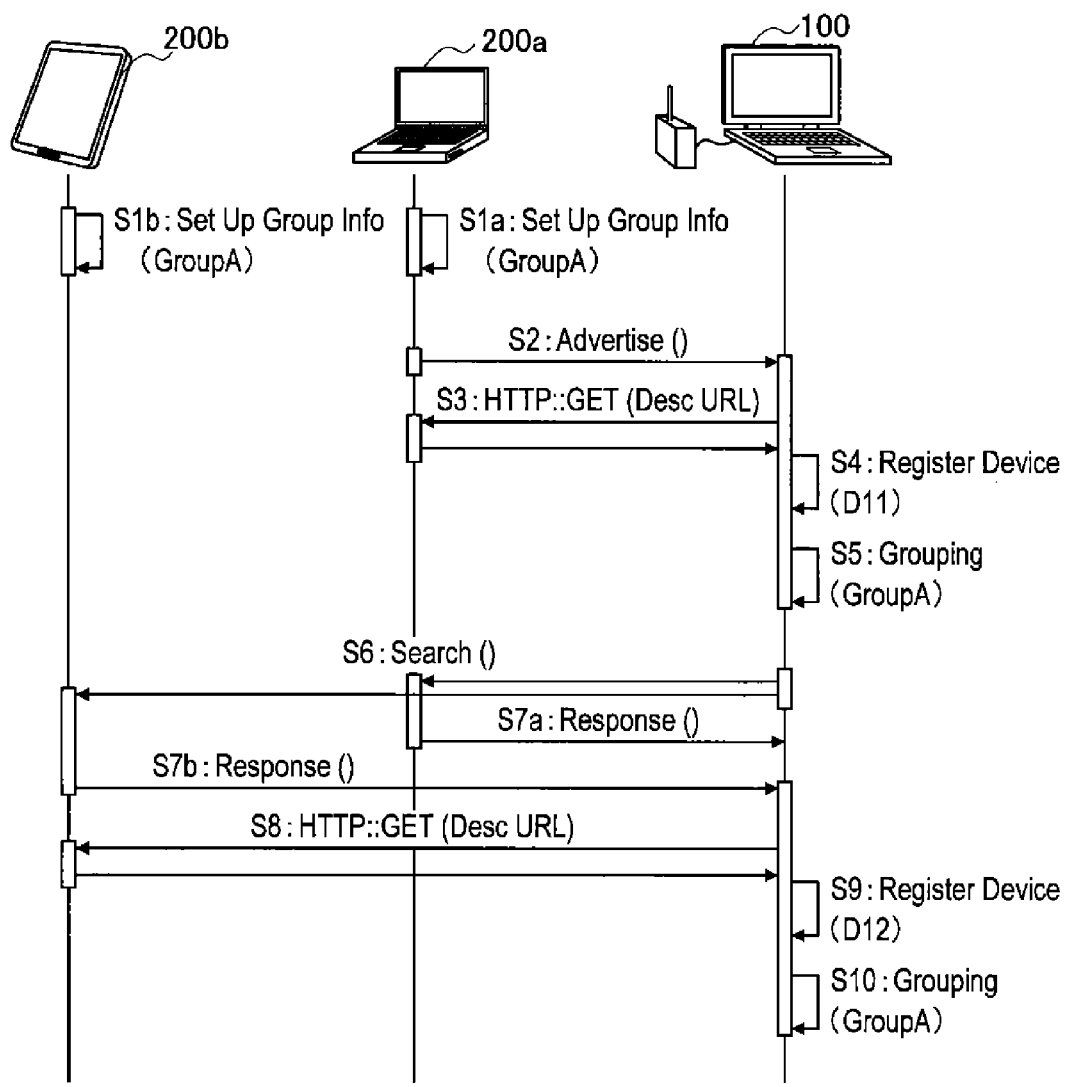

Fig. 15

```
01 | CreateObject("C1",
02 |    "<DIDL-Lite xmlns:dc="http://purl.org/dc/elements/1.1/"
03 |    xmlns:upnp="urn:schemas-upnp-org:metadata-1-0/upnp/"
04 |    xmlns="urn:schemas-upnp-org:metadata-1-0/DIDL-Lite">
05 |    <item id="" restricted="false">
06 |       <dc:title>Exercise1</dc:title>
07 |       <dc:creator>GroupA</dc:creator>
08 |       <upnp:class>
09 |          object.item.imageItem.photo
10 |       </upnp:class>
11 |    </item>
12 | </DIDL-Lite>")
```

CONTENT CREATION REQUEST

Fig. 16

```
01 | CreateObject("P1",
02 |    "<DIDL-Lite xmlns:dc="http://purl.org/dc/elements/1.1/"
03 |    xmlns:upnp="urn:schemas-upnp-org:metadata-1-0/upnp/"
04 |    xmlns="urn:schemas-upnp-org:metadata-1-0/DIDL-Lite/">
05 |    <item id="P1" parentID="C1" restricted="false">
06 |       <dc:title>Exercise1</dc:title>
07 |       <dc:creator>GroupA</dc:creator>
08 |       <res protocolInfo="http-get:*:image/jpeg:*"
09 |       importUri="http://192.168.1.2/cd/import?id=P1">
10 |       </res>
11 |       <upnp:class>
12 |          object.item.imageItem.photo
13 |       </upnp:class>
14 |    </item>
15 | </DIDL-Lite>")
```

CONTENT CREATION RESPONSE

INFORMATION PROCESSING DEVICE, PROGRAM, INFORMATION PROCESSING METHOD, AND INFORMATION PROCESSING SYSTEM

TECHNICAL FIELD

The present disclosure relates to an information processing device, a program, an information processing method, and an information processing system.

BACKGROUND ART

Group work, which has been conventionally performed using various tools such as paper, pens, whiteboards, and the like, is attempted to be performed using electronic means such as PCs (Personal Computers) and projectors. When an application that operates on a PC is used, it becomes possible to edit content, which is to be subjected to group work, in various ways, utilizing the characteristics of digital processes. Further, it also becomes possible to handle various content such as not only documents but also images, audio, or video in group work. In recent years, there have also emerged Web applications that allow a plurality of persons to cooperatively edit content via Web browsers.

As an example of a technique for assisting group work, PTL 1 below proposes controlling access to shared resources from a plurality of terminals on a per-group basis, based on the settings for user groups registered in a database in a server in advance.

CITATION LIST

Patent Literature

PTL 1: JP 3740330B

SUMMARY

Technical Problem

However, in the existing technologies for assisting group work, settings for forming a group are not simple, and there may be cases in which complex procedures are needed to start group work. Further, in order to automate the procedures for starting group work, it has been demanded to implement a special application on a terminal.

In response to such demand, if a mechanism that can realize group work using general-purpose terminals is provided, convenience for users will be improved.

Solution to Problem

Consistent with embodiments of this disclosure, an information processing apparatus is provided. The information processing apparatus comprises an input terminal configured to receive a plurality of Universal Plug and Play (UPnP) descriptions from a plurality of external devices. The UPnP descriptions comprise grouping information indicating one or more groups to which the external devices belong. The information processing apparatus further comprises a processing unit configured to process the UPnP descriptions and assign the external devices to the one or more groups based on the grouping information.

Consistent with embodiments of this disclosure, a terminal device is provided. The device comprises a user interface unit configured to receive a user input indicating a group to which the terminal device belongs. The device further comprises a group setting unit configured to generate a Universal Plug and Play (UPnP) description comprising grouping information indicating the group to which the terminal device belongs. The device further comprises a storage unit configured to store the UPnP description. The device further comprises a transmission unit configured to transmit the UPnP description to a group registration device.

Consistent with embodiments of this disclosure, a system is provided. The system comprises a terminal device. The device comprises a user interface unit configured to receive a user input indicating a group to which the terminal device belongs. The device further comprises a group setting unit configured to generate a Universal Plug and Play (UPnP) description comprising grouping information indicating the group to which the terminal device belongs. The device further comprises a storage unit configured to store the UPnP description. The device further comprises a transmission unit configured to transmit the UPnP description to an information processing device. The information processing device comprises an input terminal configured to receive the UPnP description from the terminal device. The information processing device further comprises a processing unit configured to process the UPnP description and assign the terminal device to the group based on the grouping information.

Consistent with embodiments of this disclosure, a method is provided. The method comprises receiving a plurality of Universal Plug and Play (UPnP) descriptions from a plurality of external devices. The UPnP descriptions comprise grouping information indicating one or more groups to which the external devices belong. The method further comprises assigning the external devices to the one or more groups based on the grouping information.

Consistent with embodiments of this disclosure, a method is provided. The method comprises receiving a user input indicating a group to which the terminal device belongs; generating a Universal Plug and Play (UPnP) description comprising grouping information indicating the group to which the terminal device belongs; storing the UPnP description; and transmitting the UPnP description to a group registration device.

Advantageous Effects of Invention

According to the embodiments of the present disclosure described above, it is possible to realize group work using general-purpose terminals without imposing complex procedures for users.

BRIEF DESCRIPTION OF DRAWINGS

FIG. 4 is an explanatory diagram showing an exemplary structure of a device table in accordance with an embodiment.

FIG. 5 is an explanatory diagram showing an exemplary structure of a group table in accordance with an embodiment.

FIG. 6 is an explanatory diagram showing an exemplary structure of a device-group table in accordance with an embodiment.

FIG. 7 is an explanatory diagram showing an exemplary structure of an object table in accordance with an embodiment.

FIG. 10A is an explanatory diagram showing the first half of an extended device description.

FIG. 10B is an explanatory diagram showing the second half of an extended device description.

FIG. 11 is a sequence diagram showing an exemplary flow of a group setting process in accordance with an embodiment.

FIG. 15 is an explanatory diagram illustrating an example of a content creation request transmitted from a terminal device.

FIG. 16 is an explanatory diagram illustrating an example of a response to the content creation request shown in FIG. 15.

DESCRIPTION OF EMBODIMENTS

Figure 1:
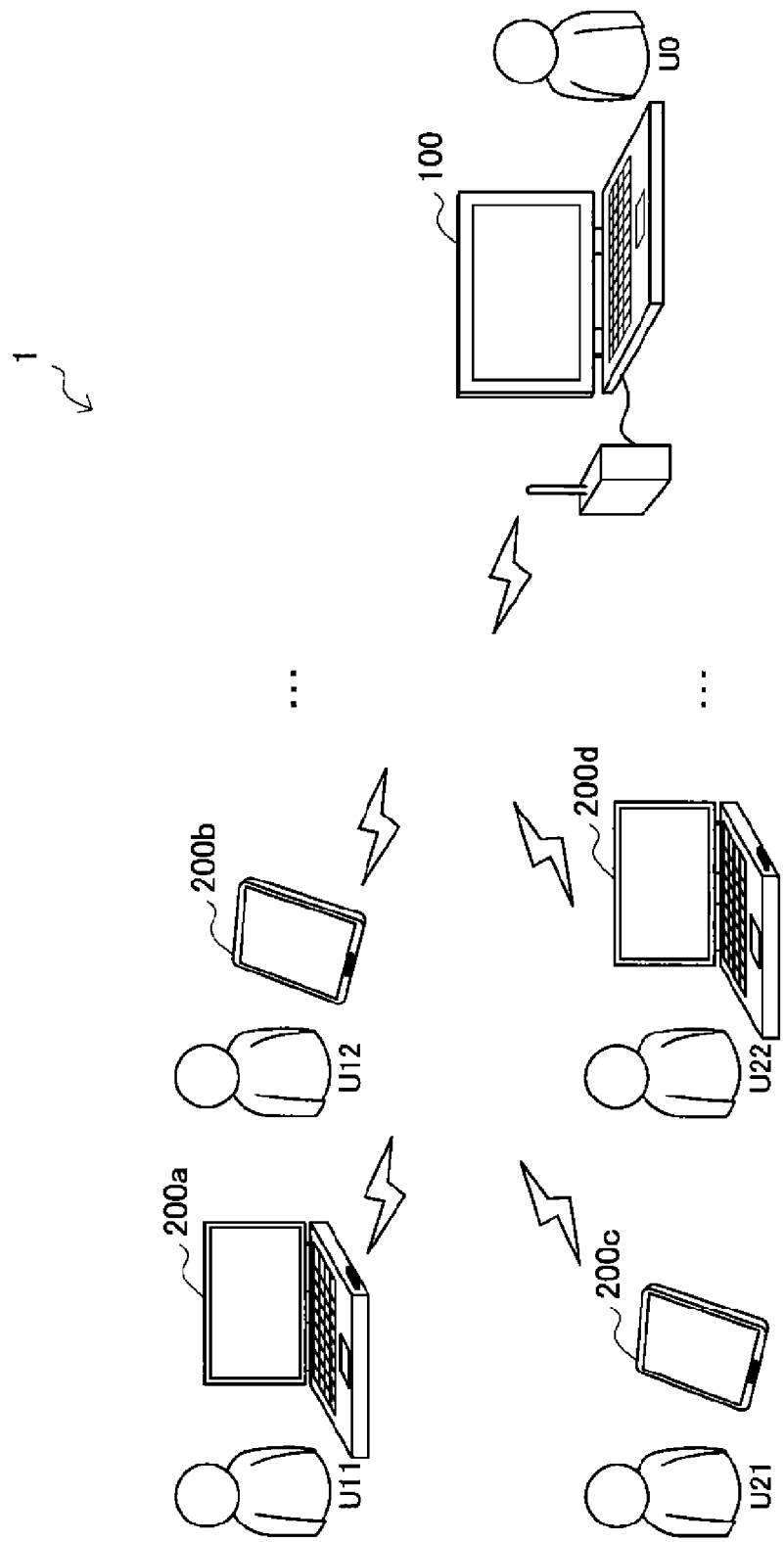
FIG. 1 is an explanatory diagram showing an exemplary schematic configuration of an information processing system in accordance with an embodiment.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted. As used herein, a "unit" may be hardware, software, or a combination of hardware and software. A "unit" may be implemented by a physical microprocessor executing instructions stored in a non-transitory storage medium.

The description will be given in the following order.
1. System Overview
2. Exemplary Device Configuration
3. Process Flow
4. Use Examples of Systems
5. Conclusion

1. SYSTEM OVERVIEW

First, an overview of an information processing system 1 in accordance with an embodiment will be described with reference to FIGS. 1 and 2.

FIG. 1 is an explanatory diagram showing an exemplary schematic configuration of the information processing system 1 in accordance with this embodiment. Referring to FIG. 1, the information processing system 1 includes an information processing device 100 and a plurality of terminal devices 200a to 200d. The information processing device 100 and the terminal devices 200a to 200d can communicate with each other. Although FIG. 1 shows an example in which wireless communication is performed, communication between the information processing device 100 and the terminal devices 200a to 200d may be either wireless communication or wire communication.

The information processing device 100 is a device having a function of a server in the information processing system 1. The information processing device 100 groups the plurality of terminal devices in the information processing system 1 into one or more groups in order to realize group-based cooperative work. The information processing device 100 may also be one of the plurality of terminal devices that participate in group work. Alternatively, the information processing device 100 may be a device provided separately from the terminal devices, for assisting group work.

FIG. 1 shows a user U0 who uses the information processing device 100. The user U0 may be a user of any group grouped by the information processing device 100, or a superuser having special authority over a plurality of (or all) groups.

The terminal devices 200a to 200d are devices used by users who perform group work. The terminal devices 200a to 200d may be, for example, PCs in various configurations such as laptop PCs, tablet PCs, or desktop PCs; workstations, smartphones; PDAs (Personal Digital Assistants); digital home electrical appliances; or game machines. In FIG. 1, a user U11 who uses the terminal device 200a, a user U12 who uses the terminal device 200b, a user U21 who uses the terminal device 200c, and a user U22 who uses the terminal device 200d are shown. The terminal devices 200a to 200d are grouped into one or more groups by the information processing device 100. As an example, the terminal devices 200a and 200b can be grouped into the same group. In that case, the users U11 and U12 are able to browse or edit the same content on the respective terminal devices. Likewise, the terminal devices 200c and 200d can be grouped into the same group. In that case, the users U21 and U22 are able to browse or edit the same content on the respective terminal devices.

In the following description of the specification, the terminal devices 200a to 200d will be collectively referred to as terminal devices 200 with alphabets at the ends of the reference numerals omitted when the terminal devices 200a to 200d need not particularly be distinguished from each other.

In this embodiment, the information processing device 100 and the terminal devices 200 support UPnP (Universal Plug and Play). UPnP is an IP (Internet Protocol)-based protocol standardized by the UPnP Forum to facilitate mutual connection between electronic devices. For example, the information processing device 100 and the terminal devices 200 detect another device on a network by acquiring an IP address using the addressing function and the discovery function of UPnP DA (Device Architecture). In addition, the information processing device 100 and the terminal devices 200 manage the storage and provision of content using an API (Application Program Interface) of UPnP AV (Audio Visual). Transmission of information between the information processing device 100 and the terminal devices 200 is typically performed via SSDP (Simple Service Discovery Protocol) messages. A mechanism for group work described in this specification is realized by extending this UPnP. The information processing device 100 and the terminal devices 200 may be implemented in accordance with the DLNA (Digital Living Network Alliance) guidelines developed on the basis of UPnP. Accordingly, mutual connectivity between devices can be further increased.

Figure 2:
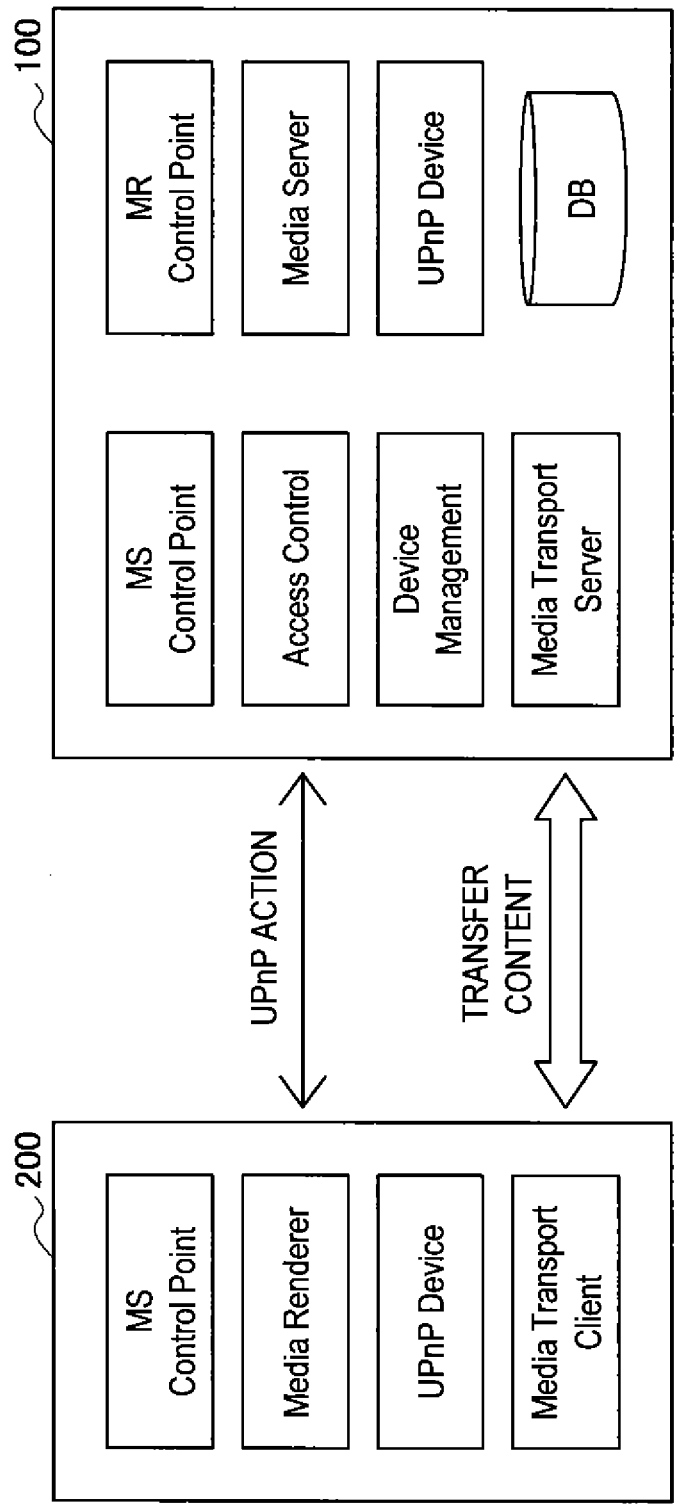
FIG. 2 is a block diagram showing exemplary protocol stacks that can be mounted on an information processing device and a terminal device shown in FIG. 1.

FIG. 2 is a block diagram showing exemplary protocol stacks that can be mounted on the information processing device 100 and the terminal device 200 in accordance with the DLNA guidelines.

As can be understood from FIG. 2, each of the information processing device 100 and the terminal device 200 is a UPnP device. The information processing device 100 operates as a media server (MS). The media server has a function of managing the provision of content from a database (DB) storing content. In addition, each of the information processing device 100 and the terminal device 200 has a MS control point function for controlling the media server. Meanwhile, the terminal device 200 operates as a media renderer (MR). The media renderer has a function of rendering content provided by the media server. Though not shown in FIG. 2, the information processing device 100 may also operate as a media renderer. In addition, the information processing device 100 has a MR control point function for controlling the media renderer. Transfer of content between the information processing device 100 and the terminal device 200 is performed using a media transport server function of the information processing device 100 and a media transport client function of the terminal device 200. These functions may be implemented utilizing the existing functional modules defined by UPnP or the DLNA guidelines.

Further, the information processing device 100 has a device management function and an access control function. The device management function is mainly a function for realizing grouping of the terminal devices 200. The access control function is a function for controlling access to content from each terminal device 200 on the basis of the aforementioned grouping. The details of such functions implemented by extending UPnP will be further described below.

2. EXEMPLARY DEVICE CONFIGURATION

Next, an exemplary configuration of each device will be described with reference to FIGS. 3 to 10B.

2-1. Exemplary Configuration of Information Processing Device

Figure 3:
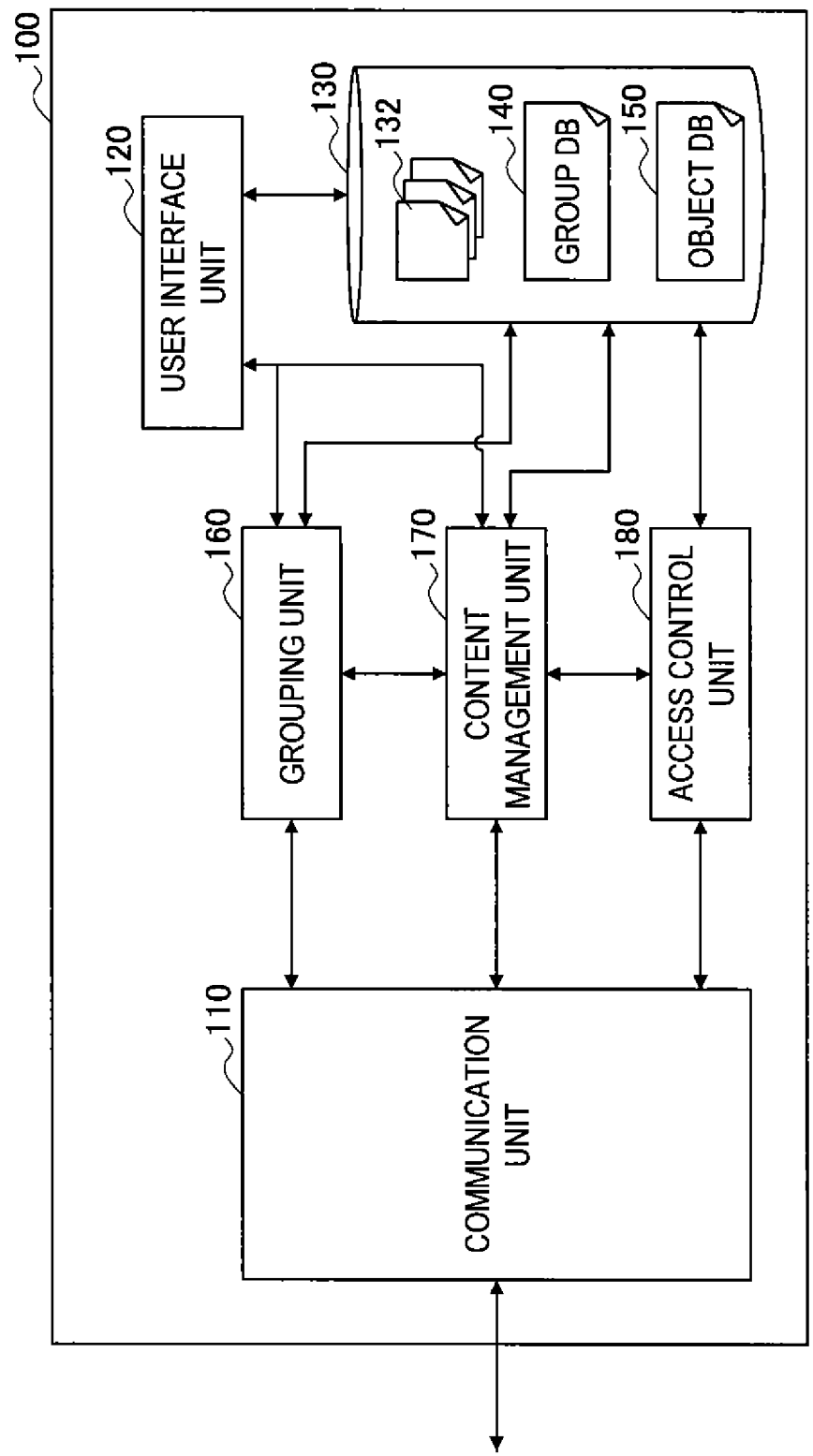
FIG. 3 is a block diagram showing an exemplary configuration of an information processing device in accordance with an embodiment.

FIG. 3 is a block diagram showing an exemplary configuration of the information processing device 100 in accordance with this embodiment. Referring to FIG. 3, the information processing device 100 includes a communication unit 110 (i.e., input/receiver/transmission unit or first communication unit), a user interface unit 120, a storage unit 130, a grouping unit 160 (i.e., processing unit), a content management unit 170 (i.e., managing unit), and an access control unit 180.

(1) Communication Unit

The communication unit 110 is a communication interface that communicates with the plurality of terminal devices 200 supporting UPnP. The communication unit 110 may be, for example, a wireless communication interface that complies with a wireless LAN (Local Area Network) scheme such as IEEE802.11a/b/g/n, or a wireless PAN (Personal Area Network) scheme such as UWB (Ultra Wideband) or Zigbee. Alternatively, the communication unit 110 may be a wire communication interface that complies with a wire LAN scheme such as Ethernet (Registered Trademark).

(2) User Interface Unit

The user interface unit 120 provides a user interface for inputting/outputting information to/from the information processing device 100. The user interface unit 120 displays a screen interface operated by a user, for example, on a display. The screen provided by the user interface unit 120 can include, for example, a screen for browsing, registering, or updating data about devices, groups, and content, and a screen for selecting content to be subjected to group work or presentation from among the content stored in the media server. A user can operate such screens via an input means such as a touch panel, a keypad, keyboard, a pointing device, or a button provided on the information processing device 100.

(3) Storage Unit

The storage unit 130 stores various programs and data for processes performed by the information processing device 100, using a storage medium such as a hard disk or semiconductor memory. For example, the storage unit 130 stores content data 132 that is an entity of content to be subjected to group work. The content data 132 is typically stored in a container created in the media server for each group. In this specification, the term "object" encompasses the concept including both the content and container.

In addition, the storage unit 130 has a group DB 140 and an object DB 150. As described below, each of the group DB 140 and the object DB 150 includes a plurality of tables.

(Group DB: Device Table)

The group DB 140 includes, for example, a device table 142, a group table 144, and a device-group table 146.

FIG. 4 shows an exemplary structure of the device table 142. Referring to FIG. 4, the device table 142 has four data items: device ID, UUID (Universally Unique Identifier), friendly name, and IP address. The device ID is an identifier for uniquely identifying each device (the information processing device 100 and the terminal devices 200) in the information processing system 1. The UUID is typically an identifier represented by a 16-byte character string. Each device is assigned a unique UUID in advance. The friendly name is a name of each device that is used when displayed on the screen. The IP address is an IP address assigned to each device by the addressing function of UPnP DA.

In the example of FIG. 4, four devices D0, D11, D12, and D21 are registered in the device table 142. For example, the device D0, the device D11, the device D12, and the device D21 can correspond to the information processing device 100, the terminal device 200a, the terminal device 200b, and the terminal device 200c, respectively. An entry corresponding to each terminal device 200 in the device table 142 can be registered when the grouping unit 160 described below detects each terminal device 200.

(Group DB: Group Table)

FIG. 5 shows an exemplary structure of the group table 144. Referring to FIG. 5, the group table 144 has two data items: group ID and group name. The group ID is an identifier for uniquely identifying each group in the information processing system 1. The group name is a name of each group that is used when displayed on the screen.

In the example of FIG. 5, three groups G0, G1, and G2 are registered in the group table 144. Among them, the group G0, which has a name "root," is a group for a user having so-called superuser privileges. Such group for the superuser need not necessarily be provided. Each entry for a group other than the group for the superuser in the group table 144 can be registered when the grouping unit 160 described below acquires group information set on each terminal device 200.

(Group DB: Device-Group Table)

FIG. 6 shows an exemplary structure of the device-group table 146. Referring to FIG. 6, the device-group table 146 has two data items: device ID and group ID. The device-group table 146 is a table for mapping between each device and a group to which the device belongs.

In the example of FIG. 6, the device D0 is mapped to the group G0. The devices D11 and D12 are mapped to the group G1. The device D21 is mapped to the group G2. Thus, the device D0 belongs to the group G0, the devices D11 and D12 belong to the group G1, and the device D21 belongs to the group G2. Each entry for a group other than the group for the superuser in the device-group table 146 can be registered when the grouping unit 160 acquires group information set on each terminal device 200.

Note that in the device-group table 146, UUID, name, or IP address of each device may also be mapped to the group ID instead of the device ID.

(Object DB: Object Table)

The object DB 150 includes, for example, an object table 152 and an object-group table 154.

FIG. 7 shows an exemplary structure of the object table 152. Referring to FIG. 7, the object table 152 has five data items: object ID, creator ID, title, class, and URI (Uniform Resource Identifier). The object ID is an identifier for uniquely identifying each object in the media server. The creator ID is device ID of a device that has created each object. The title is a name assigned to each object by a user. The class is an attribute representing the type of each object. By referring to the class attribute, it is possible to recognize which of a container or content each object is and, if each object is content, recognize what type of content each object is. The URI represents a path for accessing each object in the media server.

In UPnP AV, the following classes are defined as classes representing content, for example.

object.item.imageItem.XXX: image content ("XXX" is "photo" or the like.)
object.item.audioItem.XXX: audio content ("XXX" is "musicTrack" or the like.)
object.item.videoItem.XXX: video content ("XXX" is "movie" or the like.)

Other than the aforementioned classes, an extended class that is specific to the information processing system 1, such as a class for document content, may also be defined.

In the example of FIG. 7, four objects C1, P1, W1, and A1 are registered in the object table 152. The object C1 is a container created by the device D0. The object P1 is image content having a title "Exercise1," created by the device D11. The object W1 is document content having a title "Exercise2," created by the device D12. The object A1 is audio content having a title "Exercise3," created by the device D21. An entry in the object table 152 can be, when each object is stored in the media server, registered while being associated with each object.

(Object DB: Object-Group Table)

Figure 8:
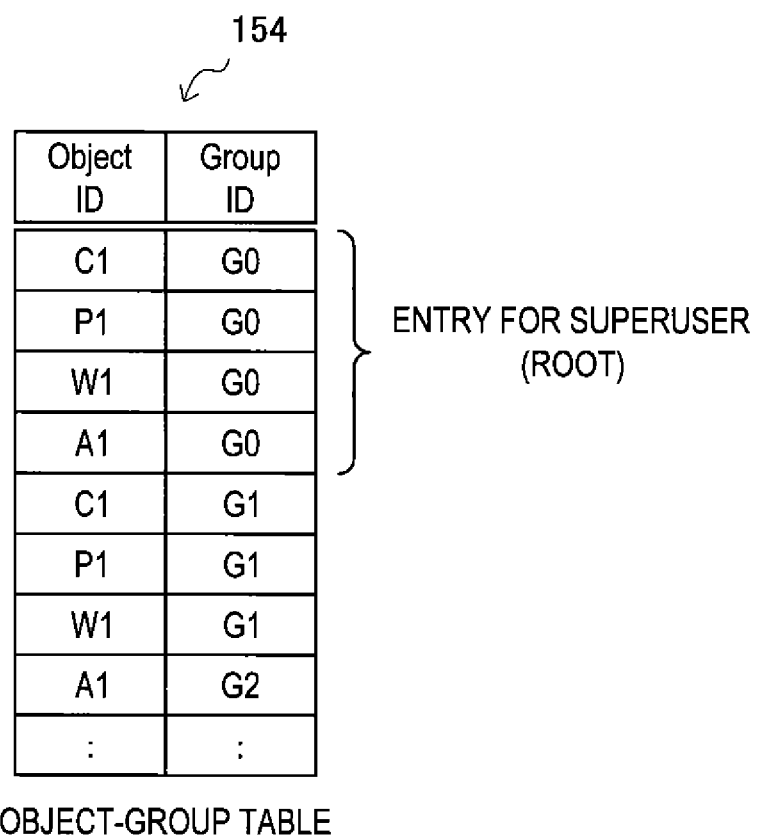
FIG. 8 is an explanatory diagram showing an exemplary structure of an object-group table in accordance with an embodiment.

FIG. 8 shows an exemplary structure of the object-group table 154. Referring to FIG. 8, the object-group table 154 has two data items: object ID and group ID. The object-group table 154 is a table for mapping between each object (i.e., a container or content) and a group that is allowed to utilize the content.

In the example of FIG. 8, the objects C1, P1, W1, and A1 are mapped to the group G0. The group G0 is a group for the superuser, and thus, users of the group G0 can utilize all of the objects C1, P1, W1, and A1. The objects C1, P1, and W1 are also mapped to the group G1. Thus, users of the group G1 can utilize the objects C1, P1, and W1. Meanwhile, the object A1 is also mapped to the group G2. Thus, users of the group G2 can utilize the object A1.

Note that the table structures shown in FIGS. 4 to 8 are only exemplary. That is, each table may include additional data items, or some of the data items may be omitted. For example, typical data items such as the date and time of creation of an entry, the date and time of update to an entry, or a person who has updated the entry can be added to each table. Further, any of the aforementioned tables may be combined with another table.

(4) Grouping Unit

The grouping unit 160 is a processing unit that can correspond to the device management function of the protocol stack exemplarily shown in FIG. 2. The grouping unit 160 receives UPnP descriptions from the plurality of terminal devices 200 in the information processing system 1 via the communication unit 110, and groups the plurality of terminal devices 200 into one or more groups on the basis of group information included in the received descriptions.

Typically, a UPnP device stores two types of description documents written in XML (Extensible Markup Language) format, called a device description and a service description. The device description is typically a description that exists for each device, and describes attribute values that are specific to the device, a list of services that can be provided by the device, and the like. The service description is a description that exists for each service that can be provided by the device, and describes a list of actions for each service. In this embodiment, at least one of such descriptions is extended. That is, group information is described in the device description or the service description stored in each terminal device 200, using an extended tag.

The grouping unit 160 may detect the terminal devices 200 to be grouped by multicasting device search signals over a network, for example. As the device search signals, M-SEARCH messages of UPnP can be used, for example. The M-SEARCH messages are multicast over the network via the communication unit 110. When the terminal device 200, which is a UPnP device, receives such M-SEARCH message, the terminal device 200 returns a response signal including a URL (Uniform Resource Locator) of the own device description.

Alternatively, the grouping unit 160 may detect the terminal device 200 to be grouped by receiving connection notification signals from the terminal devices 200 via the communication unit 110, for example. As the connection notification signals, NOTIFY messages of UPnP can be used, for example. The NOTIFY messages are multicast from the terminal devices 200 over the network. Such NOTIFY messages include a URL of the device description of the transmission-source terminal device 200.

The grouping unit 160 acquires the device description from each terminal device 200 using the aforementioned response signal returned in response to the device search signal or the URL included in the connection notification signal. When the group information is described in the device description, the grouping unit 160 can acquire the group information from each terminal device 200 through a small number of signal transmissions/receptions. When the group information is described in the service description, the grouping unit 160 further acquires the service description from each terminal device 200 using a URL of the service description included in the device description.

Note that there is a possibility that a UPnP device that does not participate in group work may transmit a response signal in response to the device search signal or a connection notification signal. Thus, the grouping unit 160 may recognize as the terminal devices 200 to be grouped only the terminal devices 200 whose device descriptions or service descriptions include predetermined tags. The predetermined tags may be tags including the aforementioned group information, for example.

The grouping unit 160, upon acquiring group information including the group ID or the group name of the group of each terminal device 200, updates the aforementioned group DB 140. More specifically, first, the grouping unit 160 assigns a device ID to a newly detected terminal device 200, and registers in the device table 142 a UUID and a friendly name included in a device description acquired from the terminal device 200 and an IP address of the terminal device 200 while associating them with the device ID. Note that the IP address can be acquired from an IP header of a response signal returned in response to a device search signal or a connection notification signal. Next, the grouping unit 160, when the acquired group information indicates a new group, registers the group ID and the group name in the group table 144. In addition, the grouping unit 160 registers in the device-group table 146 the mapping between the device ID of the detected terminal device 200 and the group ID. Then, the grouping unit 160 requests the content management unit 170 described next to create a container corresponding to the newly registered group.

(5) Content Management Unit

The content management unit 170 manages the provision of content from the media server (the storage unit 130 in the example of FIG. 3), which stores content, to the terminal devices 200. The content management unit 170 may be a processing unit that mainly extends the CDS (Content Directory Service) and the AV Transport service of UPnP AV. For example, the content management unit 170, when the grouping unit 160 identifies a new group, checks if the corresponding container already exists in the media server, and, if the container does not exist, creates a container corresponding to the new group. In addition, the content management unit 170 stores content, which has been created or changed on a given terminal device 200, into a container corresponding to the group of the terminal device 200.

The content management unit 170, upon creating a new container or storing new content, updates the aforementioned object DB 150. More specifically, the content management unit 170 first assigns an object ID to the new object (i.e., the container or the content). Then, the content management unit 170 registers in the object table 152 the creator ID, which is the device ID of the device having created the object, the title, the class, and the URI while associating them with the object ID. Next, the content management unit 170 registers in the object-group table 154 the mapping between the object ID of the registered object and the corresponding group ID. When an object is created by the terminal device 200, the group ID registered herein is the group ID of the group of the terminal device 200. Alternatively, when an object is created by a superuser, the group ID of any group designated by the superuser can be registered herein.

The content management unit 170, when content is created or changed on a given terminal device 200, notifies the other terminal devices 200 belonging to the same group as the terminal device 200 of the creation or the change of the content. In this embodiment, such notification by the content management unit 170 is performed utilizing the eventing function of UPnP. For example, the content management unit 170 registers each terminal device 200 as a subscriber of events generated for content stored in the media server. Then, the content management unit 170, when an event for given content is generated, notifies the terminal device 200, which is registered as a subscriber, of the generated event. Note that a logic of the eventing herein is extended. That is, the content management unit 170, when an event for given content is generated, identifies a group that is mapped to the content in the object-group table 154. Then, the content management unit 170 notifies only the terminal devices 200, which are the subscriber devices belonging to the identified group, of the generated event.

(6) Access Control Unit

The access control unit 180 is a processing unit that can correspond to the access control function of the protocol stack exemplarily shown in FIG. 2. The access control unit 180 controls access to the media server from the terminal devices 200 on the basis of a group to which the terminal devices 200 belong. For example, the access control unit 180, when a group to which an accessing terminal device 200 belongs is mapped to the content to be accessed in the object-group table 154, allows the accessing terminal device 200 to access to the content to be accessed.

Access to the content herein can include, in addition to acquisition of content data, browsing of the content. That is, the access control unit 180 can, when content is browsed by the terminal device 200 via the CDS, filter a content list so that information on only the content that is mapped to the group of the accessing terminal device 200 is provided. Consequently, each user can, in performing group work, browse or edit only the content created or changed by himself/herself or by another user belonging to the same group on the terminal device 200.

In addition, the access control unit 180 prioritizes a user having superuser privileges over a plurality of groups within the range of the privileges, and allows such user to access content. Further, the access control unit 180, upon receiving an instruction from a user having superuser privileges to provide content, allows the content to be provided to the terminals devices 200 belonging to any group (designated one or more groups or all groups). Such access control can be utilized when content is shared among the groups (e.g., presentation of the achievements of group work).

2-2. Exemplary Configuration of Terminal Device

Figure 9:
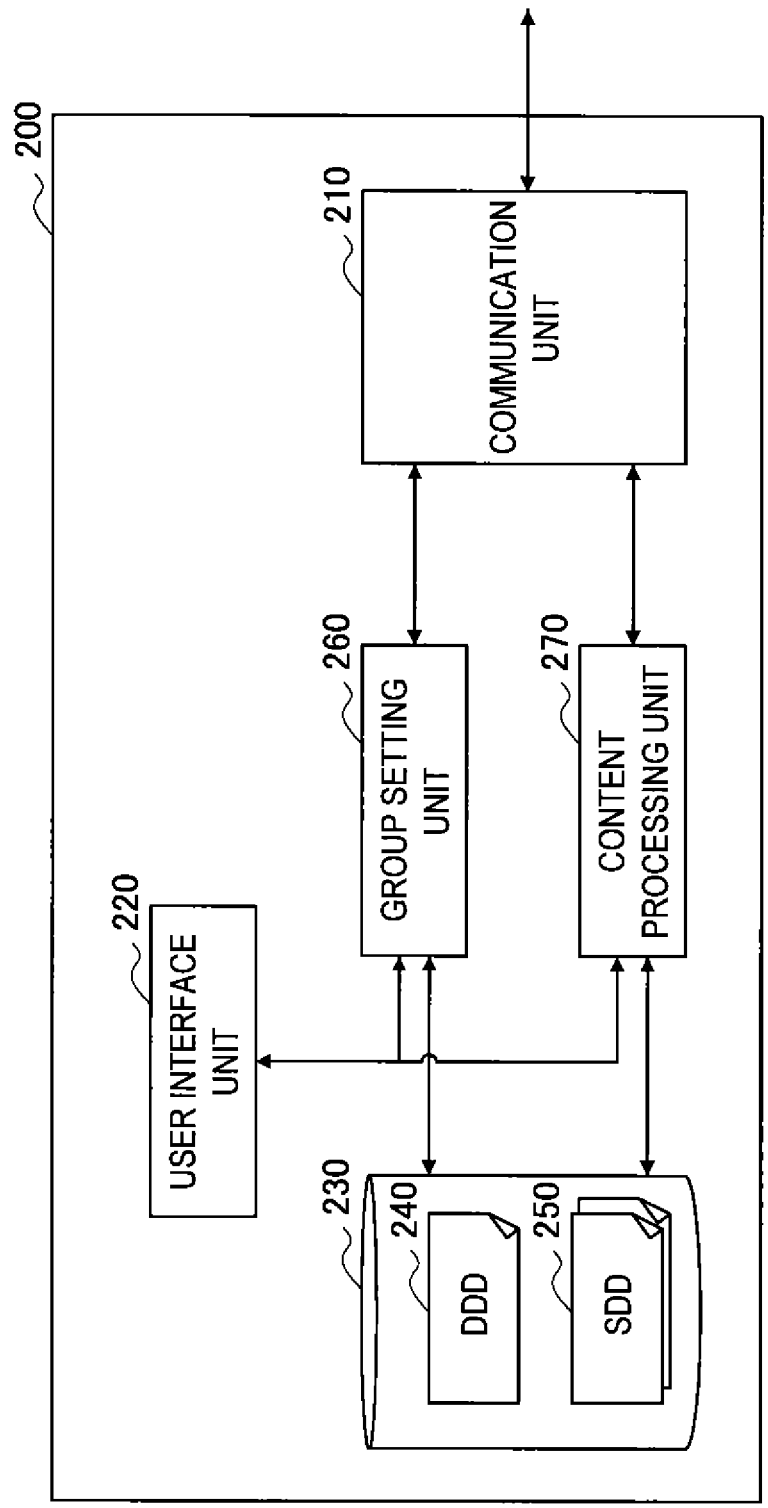
FIG. 9 is a block diagram showing an exemplary configuration of a terminal device in accordance with an embodiment.

FIG. 9 is a block diagram showing an exemplary configuration of the terminal device 200 in accordance with this embodiment. Referring to FIG. 9, the terminal device 200 includes a communication unit 210 (i.e., transmission/receiver unit or second communication unit), a user interface unit 220, a storage unit 230, a group setting unit 260, and a content processing unit 270.

(1) Communication Unit

The communication unit 210 is a communication interface for the terminal device 200 to communicate with the information processing device 100 and other devices. The communication unit 210 may be, for example, a wireless communication interface that complies with a wireless a LAN scheme such as IEEE802.11a/b/g/n, or a wireless PAN scheme such as UWB or Zigbee. Alternatively, the communication unit 110 may be a wire communication interface that complies with a wire LAN scheme such as Ethernet (Registered Trademark).

(2) User Interface Unit

The user interface unit 220 provides a user interface for inputting/outputting information to/from the terminal device 200. The user interface unit 220 provides a screen interface operated by a user, for example. The screen provided by the user interface unit 220 can include, for example, a group setting screen for setting groups and an application screen of an application for rendering or editing content to be subjected to group work. A user can operate such screens via an input means such as a touch panel, a keypad, keyboard, a pointing device, or a button provided on the terminal device 200.

(3) Storage Unit

The storage unit 230 stores various programs and data for processes performed by the terminal device 200, using a storage medium such as a hard disk or semiconductor memory. For example, the storage unit 230 stores, as a UPnP description, a device description 240 and one or more service descriptions 250. At least one of the device description 240 or the service description 250 is extended so that it includes the aforementioned group information used for the information processing device 100 to group terminal devices 200.

FIGS. 10A and 10B exemplarily show the content of the extended device description 240. Note that the line numbers on the left end of FIGS. 10A and 10B are added for descriptive purposes.

Referring to the 12th line of FIG. 10A, the friendly name of the device is described. Referring to the 20th line, the UUID of the device is described. The 32th line to the 66th line of FIG. 10B are a service list of services provided by the device. When the service description includes group information, the service description is acquired using a URL in the service list. A tag <av:group> in the 67th line is an extended tag including group information. In the example of FIG. 10B, a group name "GroupA" is set as an example of the group information.

(4) Group Setting Unit

The group setting unit 260 sets group information for a group to which the terminal device 200 should belong, in the device description or the service description. For example, the user interface unit 220 displays a group setting screen for setting groups on the display. Then, the group setting unit 260 sets the group ID or the group name of the group, which has been input or selected by a user on the group setting screen, in the device description or the service description using a predetermined extended tag.

Note that a means for setting the group information is not limited to the example herein. For example, the group setting unit 260 may, when the user ID of a user who logs into the terminal device 200 is associated with a group in advance, automatically set group information in the description in response to the login of the user. Alternatively, for example, the group setting unit 260 may, when an IC card held by a user stores group information in advance, read the group information via an IC card interface provided on the terminal device 200 and automatically set the read group information in the description. Further, a removable medium may be used instead of the IC card.

As described above, the terminal device 200 is a UPnP device supporting UPnP. Thus, the communication unit 210 of the terminal device 200, upon receiving an M-SEARCH message as a device search signal, returns a response signal including a URL of the device description 240. In addition, the communication unit 210 multicasts NOTIFY messages as connection notification signals including the URL of the device description 240 over the network. Consequently, it becomes possible for the information processing device 100 to acquire the device description 240 or the service description 250 in which the group information is set, using the URL included in the messages.

(5) Content Processing Unit

The content processing unit 270 provides an application for rendering or editing content to be subjected to group work. In addition, the content processing unit 270 downloads content from the media server, or uploads content, which has been created or changed, to the media server. The aforementioned application provided by the content processing unit 270 may be a typical application having a content rendering function or editing function (e.g., an image viewer, an AV player, an authoring tool, or a document editor).

The content processing unit 270, when content is created or changed by the application, for example, causes the information processing device 100 to notify the other terminal devices 200 belonging to the same group as the terminal device 200 of the creation or the change of the content. The notification herein is performed using the eventing function of UPnP as described above. For example, the content processing unit 270 causes the information processing device 100 to register subscription to events generated for content stored in the media server managed by the information processing device 100. The content processing unit 270 receives, through communication unit 210, a group registration notice (first notification) from the information processing device 100. In addition, subscription to events by the other terminal devices 200 belonging to the same group is similarly registered in the information processing device 100. Then, the content processing unit 270, when content is created or changed by the aforementioned application, uploads the content to the media server. Consequently, the information processing device 100 notifies the other terminal devices 200 (second notification) belonging to the same group of the content created event or changed event.

When the content processing unit 270 is notified of a created event or a changed event for content to be subjected to group work by the information processing device 100 on the basis of the registered subscription, the content processing unit 270 acquires the created or changed content from the information processing device 100. Then, the content processing unit 270 renders the acquired content (or re-renders the content if the content is already being rendered). Alternatively, the content processing unit 270 may, in response to an event notification, inform a user of the creation or the change of the content (using a message display or audio or the like). Accordingly, a plurality of users can advance group work cooperatively while sharing the latest information on content.

When the content processing unit 270 is instructed to render content by the information processing device 100 that is the MR control point, the content processing unit 270 acquires the designated content in the media server and renders the content.

3. PROCESS FLOW

Next, an exemplary process flow in the information processing system 1 in accordance with this embodiment will be described with reference to FIGS. 11 to 20.

3-1. Group Setting

FIG. 11 is a sequence diagram showing an exemplary flow of a group setting process in the information processing system 1. Note that herein, it is assumed, for example, that users of the terminal devices 200a and 200b are attempting to participate in group work.

First, the group setting unit 260 of the terminal device 200a sets group information for a group to which the terminal device 200a should belong, in the device description of the terminal device 200a (step S1a). Likewise, the group setting unit 260 of the terminal device 200b sets group information for a group to which the terminal device 200b should belong, in the device description of the terminal device 200b (step S1b). The group information may be set in response to a user instruction input via the group setting screen, or be automatically set in response to a trigger such as a user's log into the device. Herein, a group name "GroupA" is set in the device description for each of the terminal devices 200a and 200b.

Next, the communication unit 210 of the terminal device 200a executes advertisement of the discovery function of UPnP DA, and multicasts NOTIFY messages (step S2). The NOTIFY messages include a URL of the device description. The NOTIFY message is received by the information processing device 100.

The grouping unit 160 of the information processing device 100, upon receiving the NOTIFY message from the terminal device 200a, designates a URL included in the NOTIFY message to transmit a HTTP GET message, and acquires the device description of the terminal device 200a (step S3). Then, the grouping unit 160 assigns a device ID (e.g., "D11") to the terminal device 200a, and registers in the device table 142 the device ID as well as the UUID, the friendly name, and the IP address of the terminal device 200a (step S4). In addition, the grouping unit 160 recognizes the group name "GroupA" included in the device description of the terminal device 200a, and executes a grouping process shown in detail in FIG. 12 (step S5).

In addition, the grouping unit 160 of the information processing device 100 executes a search of the discovery function of UPnP DA, and multicasts M-SEARCH messages over the network via the communication unit 110 (step S6). Multicast of the M-SEARCH messages may be performed either periodically at regular intervals or be performed with an instruction from a user as a trigger. The M-SEARCH messages are received by the terminal devices 200a and 200b. The communication unit 210 of the terminal device 200a, upon receiving the M-SEARCH message, transmits a response message (step S7a). Likewise, the communication unit 210 of the terminal device 200b, upon receiving the M-SEARCH message, transmits a response message (step S7b). Such response messages include the URLs of the device descriptions.

The terminal device 200a is already registered in the device table 142. Thus, even when the grouping unit 160 of the information processing device 100 receives a response message from the terminal device 200a in response to the M-SEARCH message, the grouping unit 160 does nothing. Note that the grouping unit 160 may also check that there has been no change in the group information by acquiring the description of the terminal device 200a again.

Meanwhile, the grouping unit 160, upon receiving a response message from the terminal device 200b in response to the M-SEARCH message, designates a URL included in the response message to transmit a HTTP GET message, and acquires the device description of the terminal device 200b (step S8). Then, the grouping unit 160 assigns a device ID (e.g., "D12") to the terminal device 200b, and registers in the device table 142 the device ID as well as the UUID, the friendly name, and the IP address of the terminal device 200b (step S9). In addition, the grouping unit 160 recognizes the group name "GroupA" included in the device description of the terminal device 200b, and executes the grouping process shown in detail in FIG. 12 (step S10).

Figure 12:
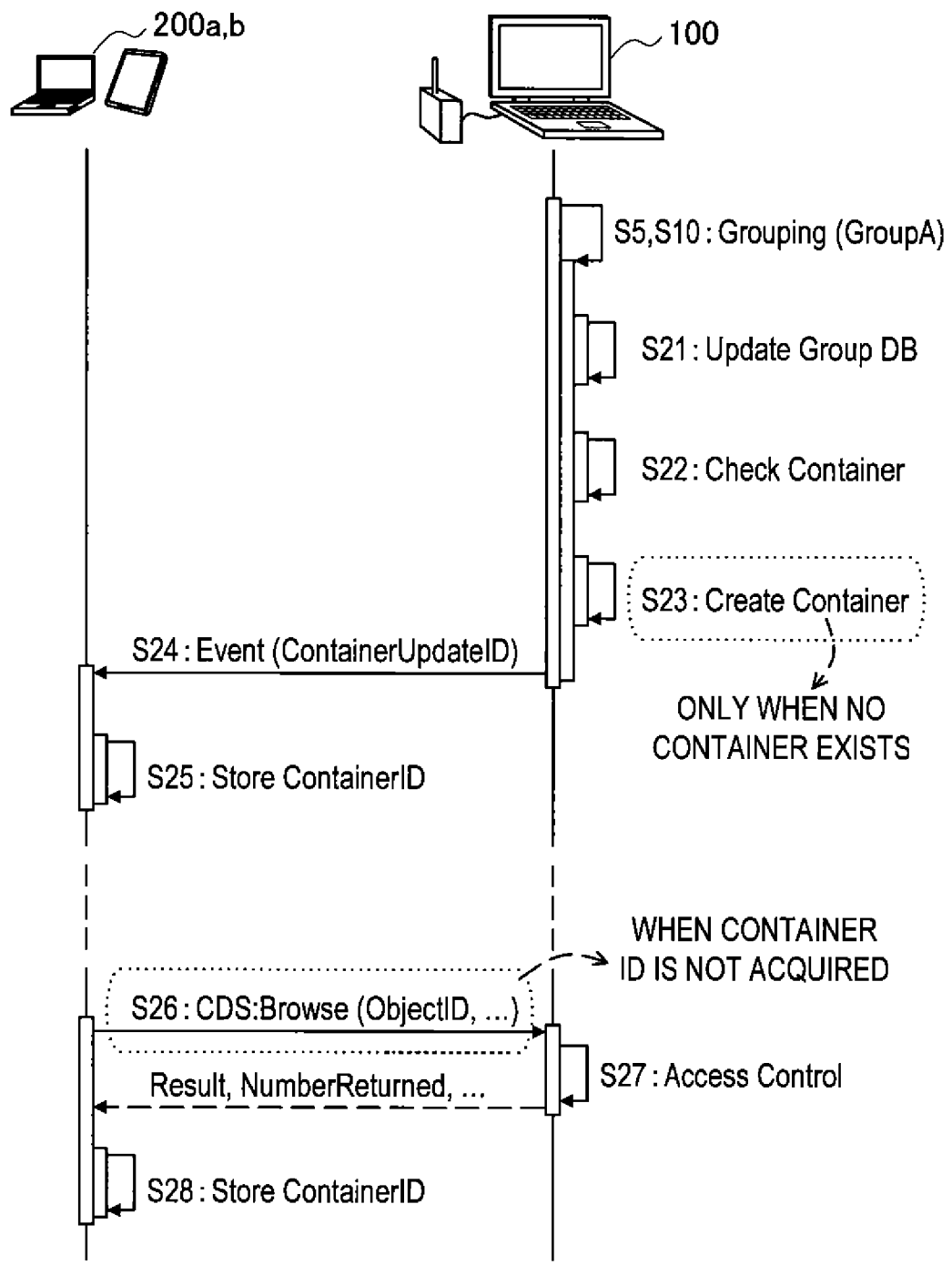
FIG. 12 is a sequence diagram showing an exemplary detailed flow of the grouping process shown in FIG. 11.

FIG. 12 is a sequence diagram showing an exemplary detailed flow of the grouping process in step S5 and step S10 of FIG. 11. Note that the flow of the grouping process may be common independently of the terminal device involved with the process. Thus, description is made herein for a single terminal device 200.

In the grouping process, the grouping unit 160 first updates the group DB (step S21). For example, the grouping unit 160, when a recognized group is a new group, assigns a group ID to the new group, and registers the group ID and the group name to the group table 144. In addition, the grouping unit 160 registers in the device-group table 146 the mapping between the device ID of the terminal device 200 and the group ID of the recognized group.

Next, the content management unit 170, in response to a request from the grouping unit 160, checks if a container corresponding to the registered group already exists in the media server (step S22). Then, the content management unit 170, if the container does not exist, creates a container corresponding to the new group in the media server (step S23). When a container corresponding to the new group is created in the media server, the terminal device 200 is notified of the container created event (step S24). Then, the container ID of the container corresponding to the new group is acquired by the content processing unit 270 of the terminal device 200, and the acquired container ID is stored (step S25).

When a container corresponding to the registered group already exists in the media server in step S22, a container corresponding to the new group is not created in the media server. Thus, the event notification in step S24 is not performed. In this case, the content processing unit 270 of the terminal device 200 that has not acquired a container ID transmits a container browsing request to the information processing device 100 (step S26). The browsing request may be performed by, for example, executing an action: Browse to the CDS of the media server. Herein, container ID="0," which means a root container, can be designated as the object ID of the first parameter of the Browse. Consequently, access control is executed by the access control unit 180 of the information processing device 100 (step S27), and a list of the container IDs of containers corresponding to a group accessible from the requesting terminal device 200 is returned. The content processing unit 270 of the terminal device 200 stores the container ID acquired as described above (step S28).

By the grouping that utilizes the UPnP platform as described above, it is possible to form a group for group work using general-purpose terminals without imposing complex procedures for users. In addition, as the group information used for grouping is set in the device description or the service description, the discovery function of UPnP can be used for collecting the group information. Thus, a grouping mechanism can be introduced with an extremely low development cost.

Figure 13:
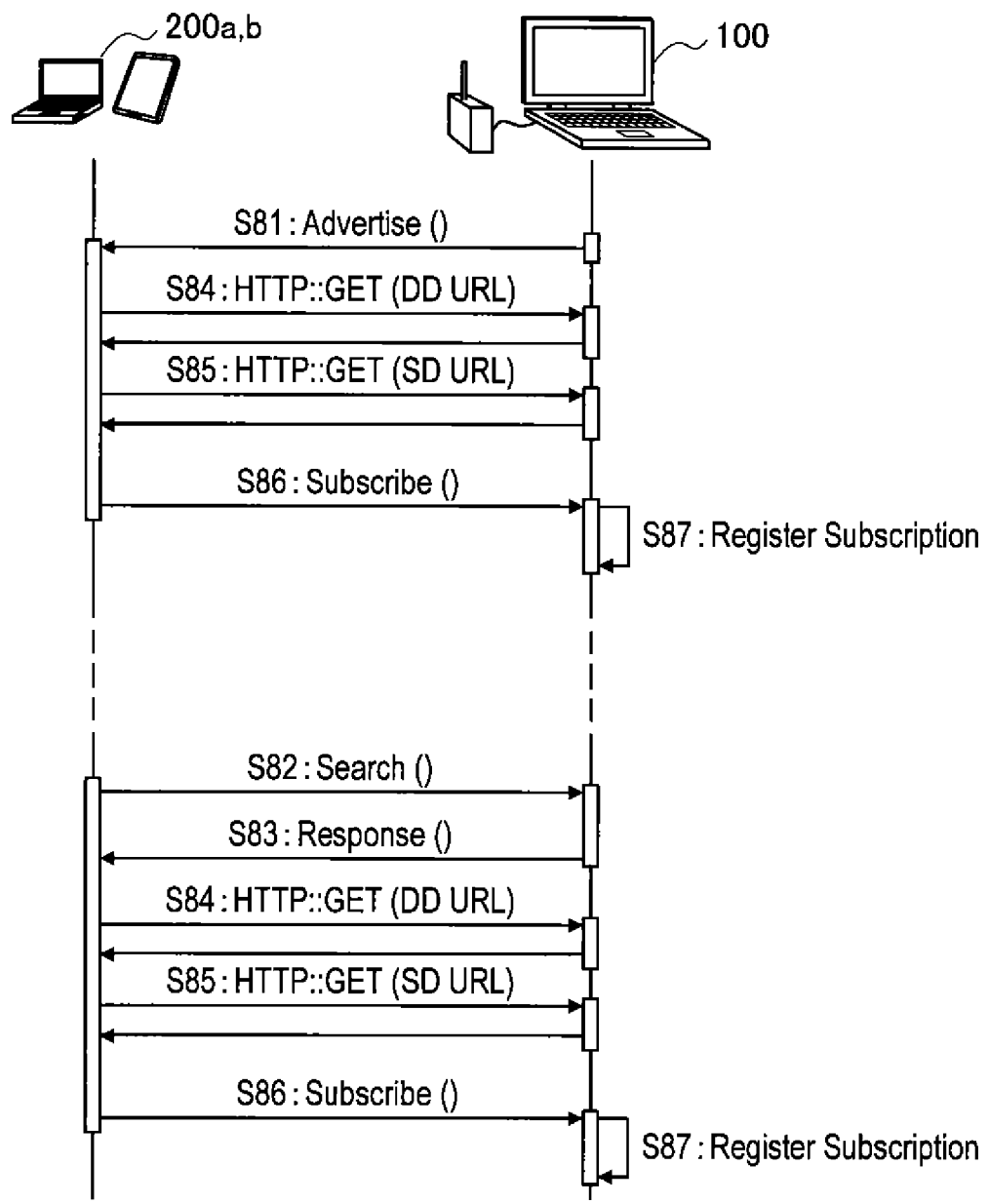
FIG. 13 is a sequence diagram showing an exemplary detailed flow of a subscriber registration process.

FIG. 13 is a sequence diagram showing an exemplary detailed flow of a subscriber registration process. Note that the flow of the subscriber registration process may also be common independently of the terminal device involved with the process. Thus, description is made herein for a single terminal device 200.

First, the communication unit 110 of the information processing device 100 periodically executes Advertisement of the discovery function of UPnP DA, and multicasts NOTIFY messages (step 81). The NOTIFY messages include a URL of the device description of the information processing device 100. The content processing unit 270 of the terminal device 200, upon receiving the NOTIFY message from the information processing device 100, designates the URL included in the NOTIFY message to transmit a HTTP GET message, and acquires the device description (DD) of the information processing device 100 (step S84). Further, the content processing unit 270 acquires the service description (SD) of the CDS from the information processing device 100 (step S85). Then, the content processing unit 270 requests the information processing device 100 to register subscription to events for the CDS (step S86). Then, the content management unit 170 of the information processing device 100 registers the terminal device 200 as a subscriber of the events (step S87). Acquisition of the DD and the SD of the information processing device 100 by the content processing unit 270 of the terminal device 200 may be performed with, as a trigger, transmission of an M-SEARCH message from the terminal device 200 (step S82) and a response from the information processing device 100 returned in response thereto (step S83), instead of receiving the NOTIFY message from the information processing device 100.

3-2. Creation and Change of Content (1) Content Creation

First Example

Figure 14:
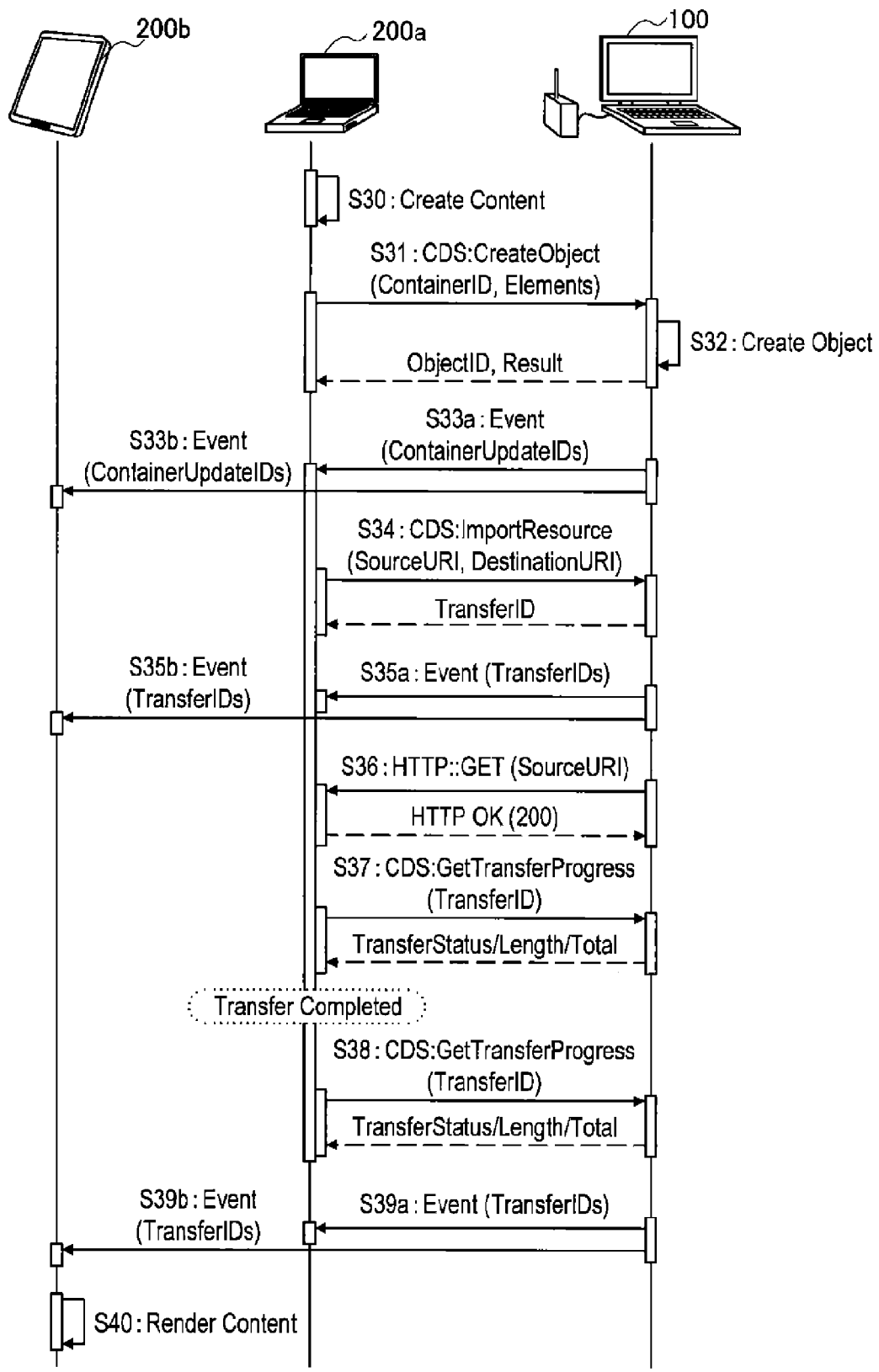
FIG. 14 is a sequence diagram showing a first exemplary flow of a content creation process in accordance with an embodiment.

FIG. 14 is a sequence diagram showing a first exemplary flow of a content creation process in the information processing system 1. In the first example, content is created by a user U11 of the terminal device 200a as one of the users who participate in group work.

First, the user U11 of the terminal device 200a creates new content such as an image, audio, video, or a document, utilizing an application provided by the terminal device 200a (step S30). Then, when content saving or uploading is instructed by the user U11, the content processing unit 270 transmits an object creation request to the information processing device 100 (step S31). The content management unit 170 of the information processing device 100, upon receiving the object creation request, assigns an object ID to the new content, and updates the object DB 150. In addition, the content management unit 170 creates an object for the new content, in a container corresponding to the group of the terminal device 200a (step S32). Then, the content management unit 170 notifies the terminal device 200a of the object ID assigned to the new content, as a response to the object creation request.

The object creation request in step S31 may be performed by, for example, executing an action: CreateObject to the CDS of the media server. FIG. 15 shows an example of a signature of the CreateObject. "C1" in the first line of FIG. 15 indicates the object ID of a container that should store new content. The object ID designated herein may be the object ID of a container notified by the information processing device 100 in the grouping process of FIG. 12. The 6th line indicates the title of the new content, the 7th line indicates the group of the requesting device, and the 9th line indicates the class of the new content. A device that has executed CreateObject can be identified by checking the transmission-source IP address acquired from an IP header or the like of a request message against the device table 142. Note that the access control unit 180 of the information processing device 100 may return a response, which rejects creation of an object, when a container designated in the object creation request is not a container for the group to which the requesting device belongs.

FIG. 16 shows an example of a signature returned in response to the CreateObject shown in FIG. 15. "P1" in the first line of FIG. 16 indicates the object ID of a new object created in the container C1. The 9th line indicates a URI for accessing the new object P1 in the media server.

Referring again to FIG. 14, description of the first exemplary flow of the content creation process is continued. The content management unit 170 of the information processing device 100, upon creating a new object, notifies the terminal devices 200a and 200b, which are registered as subscribers, of the event (steps S33a, S33b). The event notified herein can include, for example, a container update ID for uniquely identifying an update to the container C1. In the next example, the container update ID includes the object ID "C1" of the container and an integer (e.g., "5") that is counted up per update.

Example) ContainerUpdateIDs="C1,5"

Next, the content processing unit 270 of the terminal device 200a starts uploading the entity data of the created content to the information processing device 100 (step S34). The uploading in step S34 may be started by, for example, executing an action: ImportResource to the CDS of the media server. In the next example, the ImportResource includes a URI of the upload source as a first argument, and a URI of the upload destination as a second argument. The URI of the upload destination may be a URI notified as a response to the CreateObject.

Example) ImportResource ("http://192.168.1.3/Exercise1.jpg", "http://192.168.1.3/cd/import?id=P1")

The content management unit 170 notifies the terminal device 200a of a transfer ID for uniquely identifying data transfer as a response to the ImportResource. In the next example, the transfer ID is an integer (e.g., "1234") that is counted up each time data transfer is generated.

Example) ImportResource(1234)

The content management unit 170 of the information processing device 100, when uploading of the content is started, notifies the terminal devices 200a and 200b, which are registered as subscribers, of the event (steps S35a, S35b). The event notified herein can include the aforementioned transfer ID, for example.

Example) TransferID="1234"

Next, the content processing unit 270 of the terminal device 200a starts transferring the entity data of the created content to the media server, using the HTTP GET method (step S36). The GET method used herein may be the following message.

Example) GET/Exercise1.jpg HTTP/1.1

If the GET method is successful, the following response message is returned.

Example) HTTP/1.1 200 OK

The content processing unit 270 of the terminal device 200a can, in order to further acquire the status of the data transfer, further execute an action: GetTransferProgress to the CDS of the media server (steps S37, S38). In the next example, the GetTransferProgress also includes the aforementioned transfer ID as an argument.

Example) GetTransferProgress(1234)

A response message to the GetTransferProgress can include the status of the designated data transfer, the number of bytes of data that has been transferred, and the total number of bytes of data to be transferred. The following Example 1 shows a response message when the data transfer is in progress, and Example 2 shows a response message when the data transfer is complete.

Example 1) GetTransferProgress("IN_PROGRESS", 43852,125327)

Example 2) GetTransferProgress("COMPLETED", 125327,125327)

The content management unit 170 of the information processing device 100, when uploading of the content is complete, notifies the terminal devices 200a and 200b, which are registered as subscribers, of the event (steps S39a, S39b).

Example) TransferID=" "

The res element indicating a URI of the uploaded content in the media server can be updated as follows.

Example) <res protocolInfo="http-get:*:image/jpeg:*" importUri="http://192.168.1.2/cd/import?id=P1">
http://192.168.1.2/cd/content?id=P1
</res>

The terminal device 200b recognizes from the event notified in step S39b that uploading of the content created by the terminal device 200a belonging to the same group has completed. Then, the terminal device 200b can execute a rendering process shown in detail in FIG. 17 (step S40).

(2) Details of Rendering

Figure 17:
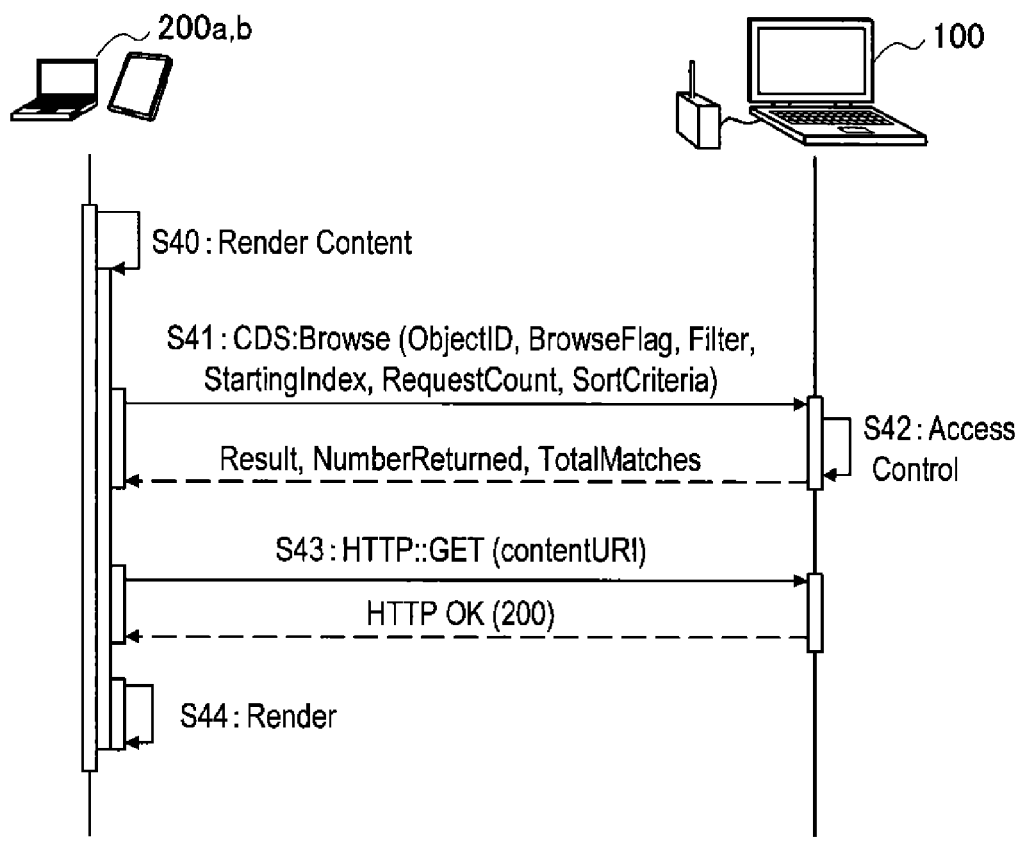
FIG. 17 is a sequence diagram showing an exemplary detailed flow of a rendering process shown in FIG. 14.

FIG. 17 is a sequence diagram showing an exemplary detailed flow of the rendering process in step S40 of FIG. 14. Note that the flow of the rendering process may be common independently of the terminal device involved with the process. Thus, description is made herein for a single terminal device 200.

In the rendering process, the content processing unit 270 first transmits a content browsing request to the information processing device 100 (step S41). The browsing request may be performed by, for example, executing an action: Browse to the CDS of the media server. The Browse can include supplementary parameters such as the object ID of the content to be browsed and the content filtering conditions.

The access control unit 180 of the information processing device 100, upon receiving the browsing request, executes access control and filters a list of content to be returned (step S42). More specifically, the access control unit 180 first refers to the device table 142, and identifies a requesting device from the transmission-source IP address of the request message. Next, the access control unit 180 refers to the device-group table 146 and the object-group table 154, and identifies content that is mapped to the group of the identified device. The list of the content identified herein is returned to the terminal device 200 as a response to the browsing request.

Next, the content processing unit 270 of the terminal device 200 downloads the entity data of the content to be rendered from the media server, using the HTTP GET method (step S43). Note that browsing in step S41 can be performed for each device or user to, when a URI of content is changed during group work, recognize such change. If a URI of the content to be rendered is known, the content may be downloaded without the browsing in step S41.

When downloading of the content is complete, the content processing unit 270 renders (or re-renders) the content (step S44).

(3) Content Creation

Second Example

Figure 18:
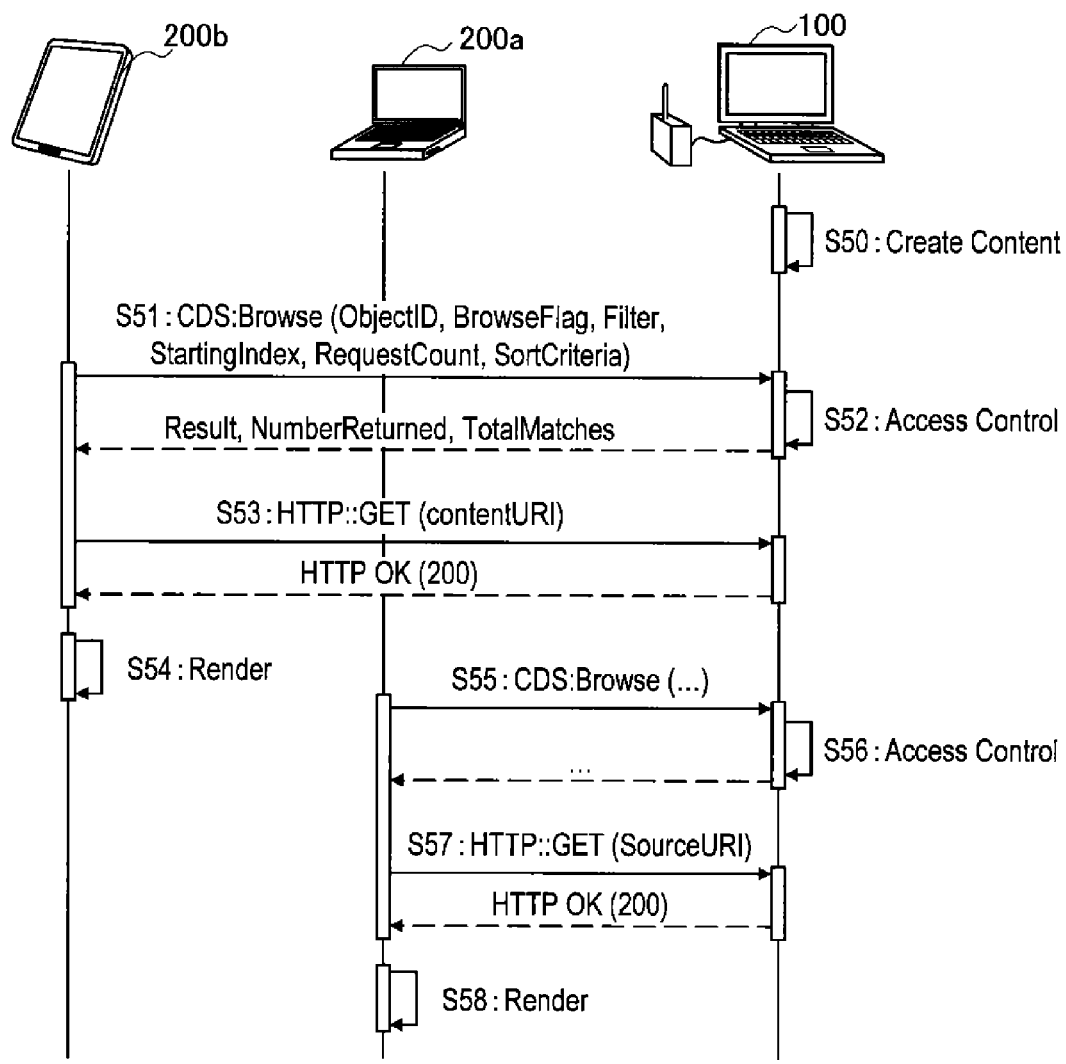
FIG. 18 is a sequence diagram showing a second exemplary flow of a content creation process in accordance with an embodiment.

FIG. 18 is a sequence diagram showing a second exemplary flow of a content creation process in the information processing system 1. In the second example, content is created by a user U0 of the information processing device 100 who is the superuser.

First, the user U0 of the information processing device 100 creates new content such as an image, audio, video, or a document in advance, utilizing a given application (step S50). The content created herein is assigned an object ID, and the object DB 150 is updated using the object ID. In addition, the created content is stored in a container designated by the user U0. The content created herein is, for example, content for group work to be performed by the group to which the terminal devices 200a and 200b belong.

The terminal device 200b, in starting group work, transmits a browsing request to the information processing device 100 (step S51). The browsing request may be performed by, for example, executing an action: Browse to the CDS of the media server. The Browse can include supplementary parameters such as the object ID of the container to be browsed and the content filtering conditions.

The access control unit 180 of the information processing device 100, upon receiving the browsing request, executes access control and filters a list of content to be returned (step S52). Then, the list of content mapped to the group of the terminal device 200b, filtered by the access control unit 180 is returned to the terminal device 200b. The list of content returned herein includes the content created by the user U0 in step S50.

The user U12 of the terminal device 200b designates the content created by the user U0 in step S50 on a screen provided by the user interface unit 220, for example. Then, the content processing unit 270 of the terminal device 200b downloads content data from the media server using the HTTP GET method (step S53). Then, upon completion of the content downloading, the content processing unit 270 renders the content (step S54).

Likewise, the terminal device 200a, in starting group work, also transmits a browsing request to the information processing device 100 (step S55). The access control unit 180 of the information processing device 100, upon receiving the browsing request, executes access control and filters a list of content to be returned (step S56). Then, the list of content mapped to the group of the terminal device 200a, filtered by the access control unit 180 is returned to the terminal device 200a. As the terminal devices 200a and 200b belong to the same group, the list of content returned herein includes the same content as the list returned to the terminal device 200b.

The user U11 of the terminal device 200a designates the content created by the user U0 in step S50 on a screen provided by the user interface unit 220, for example. Then, the content processing unit 270 of the terminal device 200a downloads content data from the media server using the HTTP GET method (step S57). Then, upon completion of the content downloading, the content processing unit 270 renders the content (step S58).

(4) Change of Content

Figure 19:
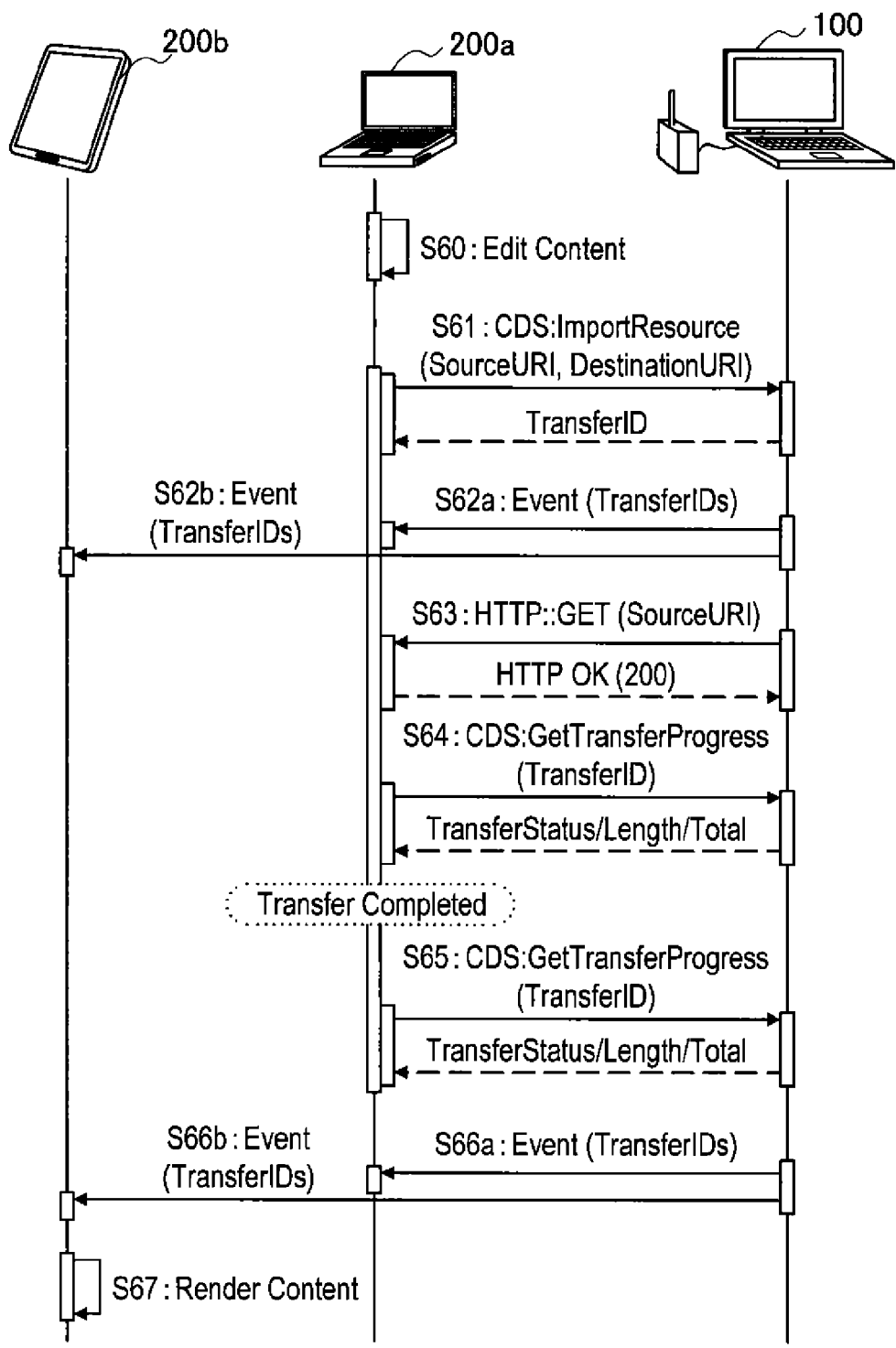
FIG. 19 is a sequence diagram showing an exemplary flow of a content changing process in accordance with an embodiment.

FIG. 19 is a sequence diagram showing an exemplary flow of a content changing process in the information processing system 1. Herein, content is changed by the user U11 of the terminal device 200a as one of the users who participate in group work.

First, the user U11 of the terminal device 200a edits content utilizing an application provided by the content processing unit 270 (step S60). The content edited herein may be content that has been created by a user of the same group as the user U11, or content prepared by the superuser. Then, when content saving or uploading is instructed by the user U11, the content processing unit 270 starts uploading the entity data of the changed content to the information processing device 100 (step S61). The uploading in step S61 may be started by, for example, executing an action: ImportResource to the CDS of the media server. After that, as in steps S34 to S40 exemplarily shown in FIG. 14, uploading of content data, event notification to the devices in the group, and rendering of the content by each device can be similarly performed (steps S62a to S67).

By utilizing the eventing function of UPnP as described above, group work can be advanced smoothly on the basis of a group that is formed using general-purpose terminals. Each user can quickly know that another user in the same group has created or changed content, through event notification.

3-3. Presentation

After the content is created or changed through group work, a circumstance where each group wants to share content with (an)other group(s) can occur. Presentation of the achievements of the group work to (an)other group(s) is an example of such circumstance.

Figure 20:
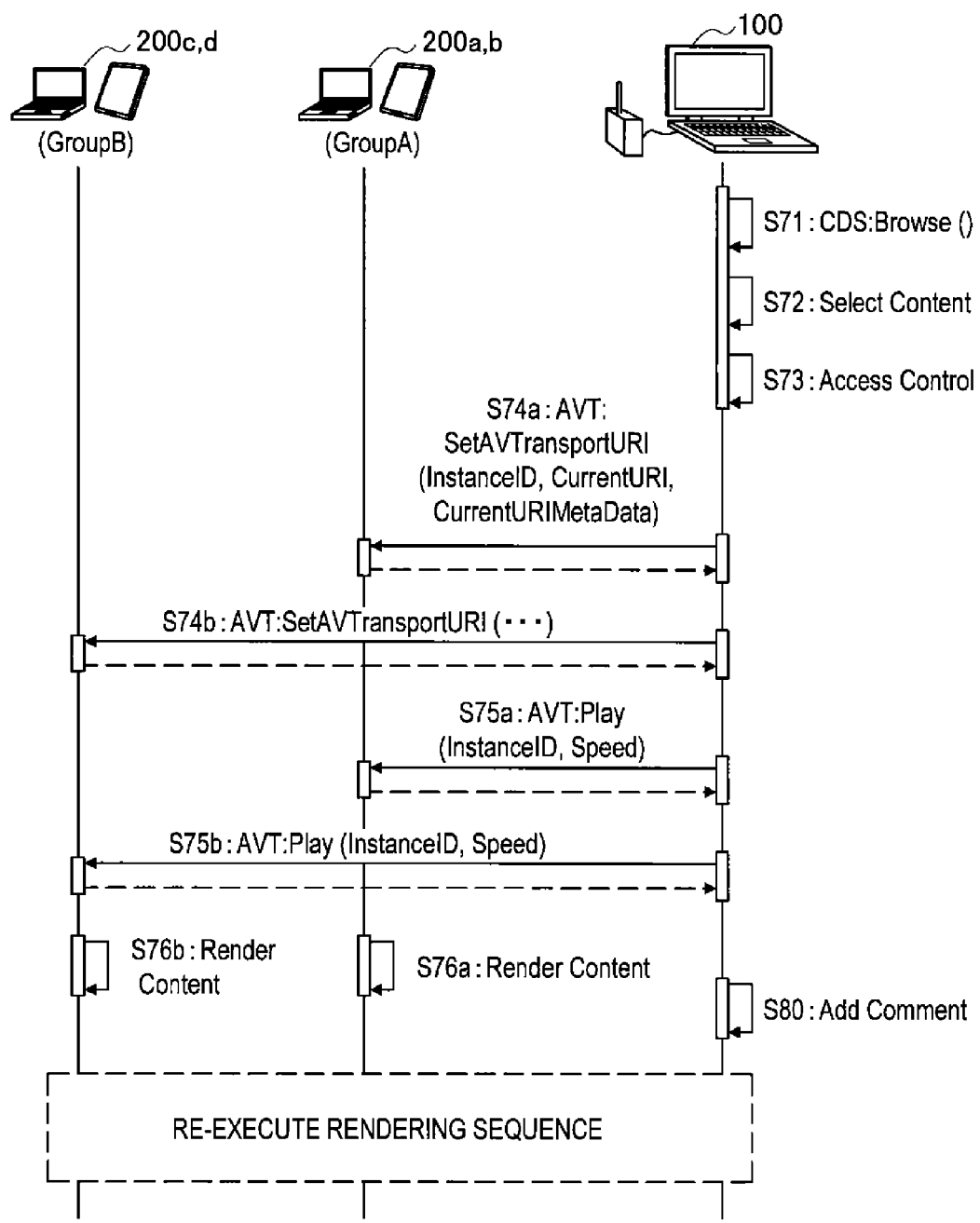
FIG. 20 is a sequence diagram showing an exemplary flow of a presentation process in accordance with an embodiment.

FIG. 20 shows an exemplary flow of a presentation process in accordance with this embodiment. Herein, content selected by the user U0 of the information processing device 100 is presented to the terminal devices 200a and 200b belonging to the "Group A" and the terminal devices 200c and 200d belonging to the "Group B."

First, the content management unit 170 of the information processing device 100 browses content in the media server that the content management unit 170 manages (step S71). The browsing can be performed by, for example, executing an action: Browse to the CDS. Next, content to be presented is selected by the user U0 from a list of content displayed on the screen (step S72). Then, the access control unit 180 updates the object DB 150 so that content is allowed to be provided to devices belonging to any group (a group(s) designated by the user U0 or all groups) (step S73).

Next, the content management unit 170, as a preparation for providing content, notifies the terminal devices 200a, 200b, 200c, and 200d of a URI of the selected content (steps S74a, S74b). The notification herein may be performed by, for example, executing an action: SetAVTransoprtURI of UPnP AV. Then, the content management unit 170 instructs the terminal devices 200a, 200b, 200c, and 200d to render the content whose URI has been notified (steps S75a, S75b). The instruction here may be issued by executing an action: Play of UPnP AV, for example. The content processing unit 270 of each of the terminal devices 200a, 200b, 200c, and 200d, upon receiving the rendering instruction, accesses the notified URI to acquire the content, and renders the acquired content (steps S76a, S76b).

After that, for example, the user U0 of the information processing device 100 who is the superuser can add a comment to the content in the presentation, on the screen provided by the user interface unit 120 (step S80). When a comment is added to the content in the presentation, the processes in steps S74a to S76b are executed again, so that the added comment can be browsed by the users of the terminal devices 200a to 200d.

As described above, as the technology related to the present disclosure is based on the UPnP platform, achievements of group work can be easily presented utilizing the existing UPnP AV function.

4. USE EXAMPLES OF SYSTEMS

The technology in accordance with the present disclosure can be utilized in various scenes associated with group work. In this section, two typical examples and other examples will be described.

4-1. First Use Example

Figure 21:
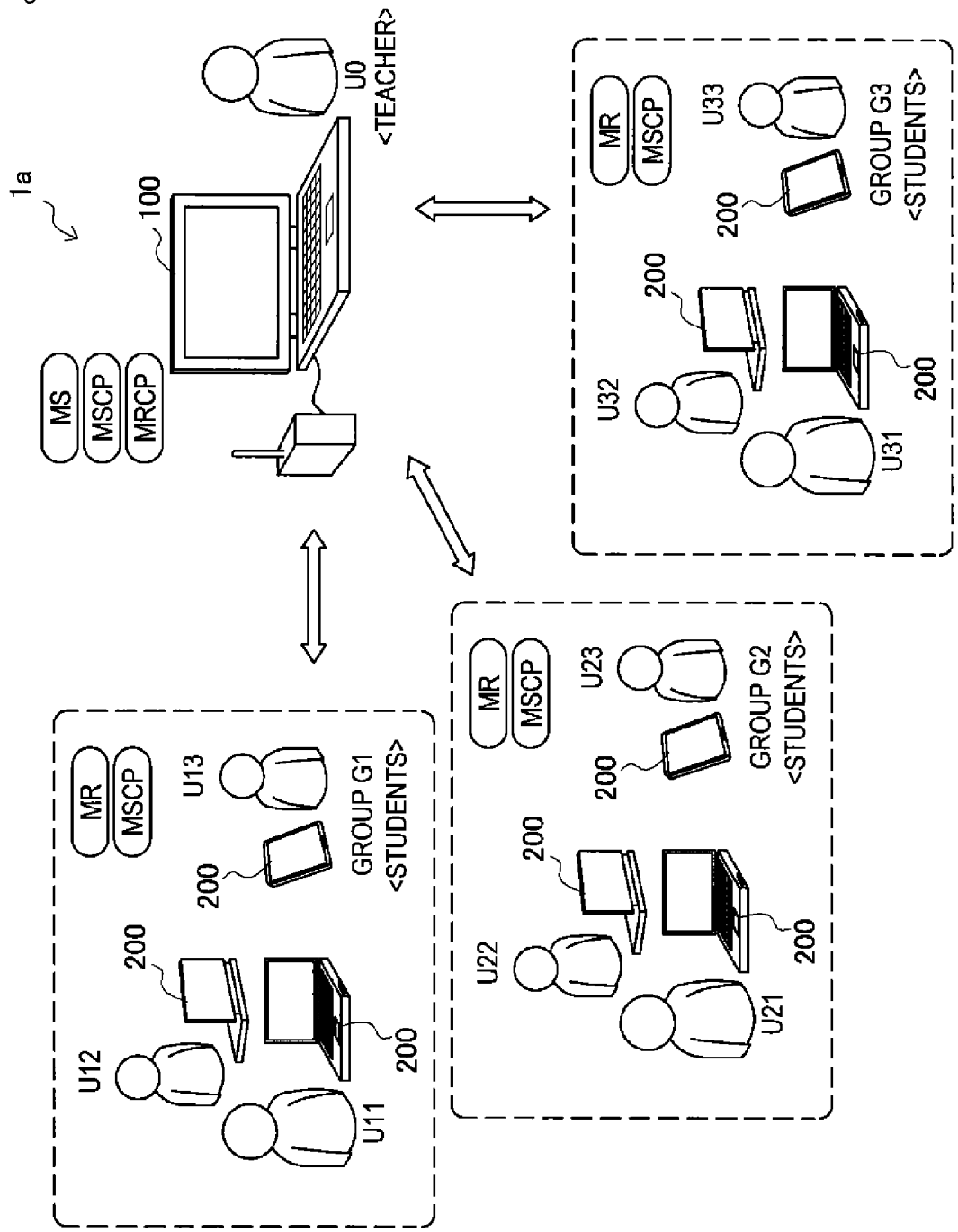
FIG. 21 is an explanatory diagram illustrating an overview of a system in a first use example.

FIG. 21 shows an overview of an information processing system 1a in a first use example. The first use example is an example that mainly focuses on group work in the places of education such as schools or training facilities of enterprises.

In the first use example, a user who is a teacher and users who are students exist. A user U0 who is a teacher in the information processing system 1a uses the information processing device 100. Users who are students use their respective terminal devices 200. Users U11, U12, and U13 belong to a group G1. Users U21, U22, and U23 belong to a group G2. Users U31, U32, and U33 belong to a group G3. Each user, in starting group work, sets the group ID or the group name of the group in which the user attempts to participate, on the terminal device 200 as described in connection with steps S1a and S1b in FIG. 11.

The information processing device 100 detects the terminal devices 200 through the discovery function of UPnP. Then, the grouping unit 160 of the information processing device 100, on the basis of group information included in the description of each device, groups the terminal devices 200 into three groups G1, G2, and G3.

After that, group work is performed in each group in accordance with the sequence exemplarily shown in FIG. 14, FIG. 18, or FIG. 19. For example, media renderers (MR) of the three terminal devices 200 belonging to the group G1 render only the content mapped to the group G1 among the content stored in the media server (MS). The MRs of the three terminal devices 200 belonging to the group G2 render only the content mapped to the group G2. The MRs of the three terminal devices 200 belonging to the group G3 render only the content mapped to the group G3.

Upon termination of the group work of each group, the user U0 who is the teacher makes a presentation in accordance with the sequence exemplarily shown in FIG. 20. For example, the user U0 causes the terminal devices 200 belonging to the groups G2 and G3 to be provided with and render the content created by the group G1. Likewise, the user U0 causes the terminal devices 200 belonging to the groups G1 and G3 to be provided with and render the content created by the group G2. Further, the user U0 causes the terminal devices 200 belonging to the groups G1 and G2 to be provided with and render the content created by the group G3.

4-2. Second Use Example

Figure 22:
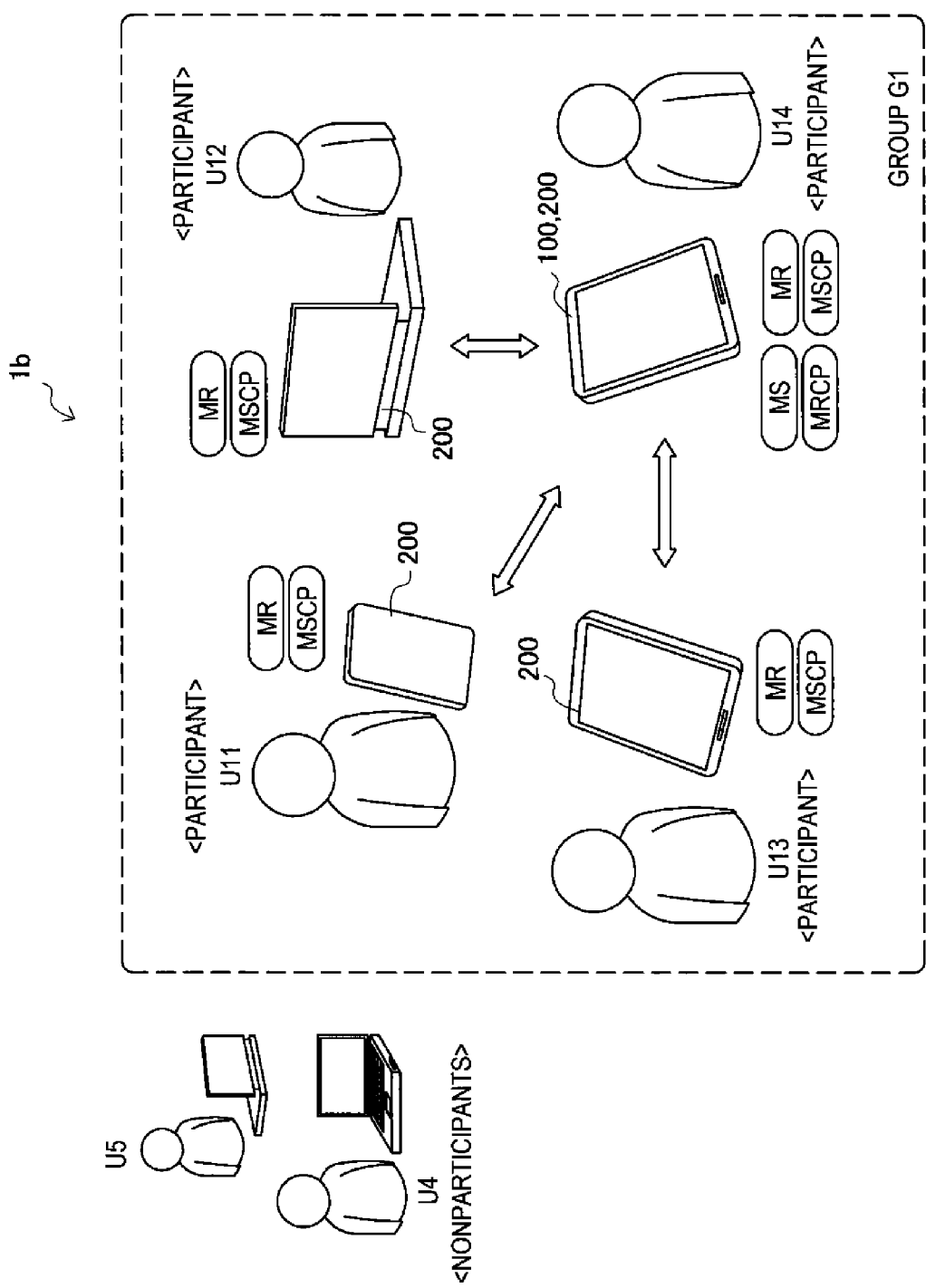
FIG. 22 is an explanatory diagram illustrating an overview of a system in a second use example.

FIG. 22 shows an overview of an information processing system 1b in a second use example. The second use example is an example that mainly focuses on group work in the places of meetings at enterprises, laboratories, or the like.

In the second use example, four users U11 to U14 are attempting to browse or edit common content in a meeting. Among such users U11 to U14, there exists no special user like the teacher in the first use example. However, a device used by the user U14 has both the functions of the terminal device 200 and the information processing device 100 described above, and plays a leading role in grouping devices.

The users U11, U12, U13, and U14 all belong to the group G1, and set, in starting group work, a common group ID or group name on the respective devices. The device used by the user U14 detects such devices through the discovery function of UPnP, and executes a grouping process. Accordingly, it becomes possible for the users U11, U12, U13, and U14 to browse or edit common content stored in the media server (MS).

In FIG. 22, other users U4 and U5 are also shown. The users U4 and U5 are located near the users U11, U12, U13, and U14. However, as the access control unit 180 of the information processing device 100 rejects access to the content for the group G1 from the devices of the users U4 and U5, the content for the group G1 is prevented from being browsed by the users U4 and U5.

4-3. Other Use Examples

The technology in accordance with the present disclosure can also be utilized for sharing content on a home network. For example, there may be a case in which parents of a child may have content that should not be browsed by the child. In such a case, the content can be prevented from being browsed by the child if a group, which differs from the group allowed to access the content, is set on the device used by the child (or if no group is set on the device used by the child).

Note that the technology in accordance with the present disclosure can be utilized in various scenes associated with group work, without limitation to the examples described herein.

5. CONCLUSION

Heretofore, the information processing system 1 in accordance with an embodiment has been described in detail with reference to FIGS. 1 to 22. According to this embodiment, group information is set in a description in each terminal device that supports UPnP, and the information processing device groups the plurality of terminal devices into one or more groups on the basis of the group information. Then, rendering of content is realized on a per-group basis. Thus, it is possible to realize group work using terminals that support widespread UPnP, without imposing complex procedures for users. For example, in recent years, portable terminals such as tablet PCs or smartphones having a communication function that complies with the wireless LAN scheme are used by many users. According to this embodiment, when a plurality of users just bring such portable terminals close to each other and start their communication functions, a group of the terminals is formed, whereby group work can be performed. The aforementioned mechanism is also advantageous in that it can operate independently of the type of OS (Operating System) or the type of device.

According to this embodiment, the aforementioned group information is set in a device description or a service description. Thus, the information processing device can utilize the existing discovery function of UPnP for collecting the group information. Thus, a grouping mechanism in accordance with this embodiment can be introduced with an extremely low development cost. When the aforementioned group information is set in a device description, a URL of the device description is included in a response to an M-SEARCH message or in a NOTIFY message. Thus, the information processing device can collect the group information through a small number of signal transmissions/receptions.

According to this embodiment, group information set on each terminal device may be only a group identifier or a group name for identifying each group. Thus, even when an individual user sets group information, the setting procedures are easy to perform.

According to this embodiment, a container corresponding to each group is created in the media server. Then, content created or changed for each group is stored in the corresponding container. Thus, access control for each group can be easily implemented using containers in the media sever of UPnP.

According to this embodiment, each terminal device is registered as a subscriber of events generated for the media server (or the CDS), and the subscriber is notified of creation or change of content as an event. Thus, users in a group corresponding to the content can quickly know the creation or change of the content. Such a mechanism can also be implemented easily with a low development cost by extending the eventing function of UPnP.

According to this embodiment, a user having superuser privileges can be defined. For example, when there exists a user such as a teacher who plays a leading role in group work, setting the user as the superuser will allow presentation of the achievements of the group work to be advanced smoothly.

According to this embodiment, not only image content, audio content, and video content for which a specific class is defined in UPnP, but also document content can be stored in the media server. If the class definition of UPnP is extended to enable handling of high-level document content, the types of content that can be subjected to group work will become diverse. Consequently, the advantages of the group work can be enjoyed in more places.

Note that at least some of the processes performed by each device described in this specification are implemented using software. A program that constitutes the software is stored in a storage medium provided in or outside each device in advance. Then, each program is read into RAM when executed, for example, and is executed by a processor such as a CPU (Central Processing Unit).

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1)

An information processing device including a grouping unit configured to, on the basis of group information included in UPnP descriptions received from a plurality of terminal devices supporting the UPnP, group the plurality of terminal devices into one or more groups.

(2)

The information processing device of (1), further including a content management unit configured to, when content is created or changed on a first terminal device, notify at least a second terminal device belonging to the same group as the first terminal device of the creation or the change of the content on the basis of a result of grouping performed by the grouping unit.

(3)

The information processing device of (1) or (2), wherein the descriptions are device descriptions or service descriptions.

(4)

The information processing device of (3), wherein the descriptions are device descriptions.

(5)

The information processing device according to any one of (1) to (4), wherein the group information includes a group identifier or a group name for identifying each group.

(6)

The information processing device of (2), wherein the content management unit has, in a media server, a container corresponding to each group, and stores the content created or changed on the first terminal device into a container corresponding to a group to which the first terminal belongs.

(7)

The information processing device of (2) or (6), wherein the content management unit registers each terminal device as a subscriber of an event for content stored in a media server, and notifies each terminal device of an event related to creation or change of each content, using an eventing function of the UPnP.

(8)

The information processing device of any one of (1) to (7), further including an access control unit configured to control access to a media server by a terminal device on the basis of a group to which the terminal device belongs.

(9)

The information processing device of (8), wherein the content management unit stores into a storage medium first mapping information that maps between each content and a group that is allowed to utilize the content, and the access control unit, when a group to which an accessing terminal device belongs is mapped to content to be accessed, allows the accessing terminal device to access the content to be accessed.

(10)

The information processing device of (9), wherein the first mapping information includes data that identifies a terminal device that has created each content or data that identifies a group to which the terminal device belongs.

(11)

The information processing device of any one of (8) to (10), wherein the access control unit, upon receiving, from a user having superuser privileges, an instruction to provide content, allows the content to be provided to a terminal device belonging to any group.

(12)

The information processing device of (2), wherein the grouping unit stores into a storage medium second mapping information that maps between each terminal device to a group to which the terminal device belongs, and the content management unit identifies a terminal device belonging to the same group as the first terminal device using the second mapping information.

(13)

The information processing device of (12), wherein the second mapping information includes data indicating mapping between an identifier, a UUID, a name, or an IP address of each terminal device and a group.

(14)

The information processing device of any one of (1) to (13), wherein the grouping unit detects a terminal device to be grouped by multicasting an M-SEARCH message over a network or receiving a NOTIFY message transmitted from each terminal device.

(15)

The information processing device of (14), wherein the grouping unit acquires the description from each terminal device using a URL included in a response to the M-SEARCH message or the NOTIFY message.

(16)

The information processing device of (15), wherein the grouping unit recognizes, as the terminal device to be grouped, a terminal device whose description includes a predetermined tag.

(17)

The information processing device of (16), wherein the predetermined tag is a tag including the group information.

(18)

The information processing device of any one of (1) to (17), wherein each of the plurality of terminal devices operates as a media renderer, and the information processing device operates as a control point that controls the media renderer.

(19)

The information processing device of (18), wherein the information processing device further operates as a media server, and each of the plurality of terminal devices further operates as a control point that controls the media server.

(20)

The information processing device of (19), wherein the information processing device stores into the media server image content created or changed by each terminal device.

(21)

The information processing device of (19), wherein the information processing device stores into the media server audio content created or changed by each terminal device.

(22)

The information processing device of (19), wherein the information processing device stores into the media server video content created or changed by each terminal device.

(23)

The information processing device of (19), wherein the information processing device stores into the media server document content created or changed by each terminal device.

(24)

The information processing device of any one of (1) to (23), further including a communication unit configured to communicate with the plurality of terminal devices.

(25)

The information processing device of any one of (1) to (24), wherein the information processing device is also a target to be grouped by the grouping unit, and the information processing device further comprises a setting unit configured to set group information of the information processing device used for the grouping.

(26)

A program for causing a computer that controls an information processing device that communicates with a plurality of terminal devices supporting UPnP, to function as: a grouping unit configured to, on the basis of group information included in UPnP descriptions received from the plurality of terminal devices, group the plurality of terminal devices into one or more groups.

(27)

An information processing method in an information processing device that communicates with a plurality of terminal devices supporting UPnP, the method comprising:

receiving from the plurality of terminal devices UPnP descriptions including group information; and grouping the plurality of terminal devices into one or more groups on the basis of the received group information.

(28)

A terminal device supporting a UPnP protocol, comprising:

a storage unit that stores a UPnP description including group information used for grouping the terminal device and other devices into one or more groups; and a communication unit configured to transmit the description stored in the storage unit to an information processing device that performs the grouping.

(29)

The terminal device of (28), further including an application for creating or changing content to be subjected to group work.

(30)

The terminal device of (29), further including a content processing unit configured to, when the content is created or changed by the application, notify other devices belonging to the same group as the terminal device of the creation or the change of the content.

(31)

The terminal device of (30), wherein the content processing unit causes the application to render content created or changed by another device upon receiving a notification from the information processing device.

(32)

The terminal device of (30), wherein the content processing unit, in response to a notification from the information processing device, informs a user that the content has been created or changed by the other device.

(33)

The terminal device of (28), further including a user interface for a user to set the group information.

(34)

The terminal device of (28), further including a group setting unit configured to acquire, from a medium storing group information associated with a user, the group information, and set the group information in the description.

(35)

An information processing system including a plurality of terminal devices supporting a UPnP protocol and an information processing device that communicates with the plurality of terminal devices, wherein each of the plurality of terminal devices includes a storage unit that stores a UPnP description including group information, and the information processing device includes a grouping unit configured to, on the basis of the group information included in the descriptions received from the plurality of terminal devices, group the plurality of terminal devices into one or more groups.

Furthermore, the present technology may also be configured as below.

(1) An information processing apparatus comprising:

an input terminal configured to receive a plurality of Universal Plug and Play (UPnP) descriptions from a plurality of external devices, the UPnP descriptions comprising grouping information indicating one or more groups to which the external devices belong; and a processing unit configured to:

process the UPnP descriptions; and assign the external devices to the one or more groups based on the grouping information.

(2) The apparatus of (1), wherein:

the UPnP descriptions further comprise device identifiers of the external devices; and the processing unit is configured to assign the external devices to the one or more groups based on the device identifiers.

(3) The apparatus of (1) or (2), wherein the processing unit is configured to assign a first external device and a second external device of the external devices, to a first group, and the apparatus further comprises a managing unit configured to:

receive, from the first external device, a notification indicating one of a creation or a modification of content by the first external device;

generate an event message indicating the notification; and supply the event message to the second external device.

(4) The apparatus of (3), further comprising a storage medium, wherein the managing unit is configured to:

determine whether the storage device includes a container assigned to the first group;

assign a new container to the first group if there has not been a container assigned to the first group; and store the content associated with the notification.

(5) The apparatus of (3) or (4), wherein the managing unit is configured to:

register the first external device and the second external device as event subscribers within the first group; and notify the event subscribers of an event related to content, using an event notification function of a UPnP protocol.

(6) The apparatus of any one of (1) to (3), wherein the UPnP descriptions comprises one of a device description or a service description.

(7) The apparatus of any one of (1) to (3), or (6), wherein the group information comprises at least one of a group identifier or a group name.

(8) The apparatus of any one of (3) to (5), further comprising an control unit configured to approve a request, from a third external device, for access to the content of the first group if the third external device is assigned to the first group.

(9) The apparatus of any one of (3) to (5), or (8), wherein the control unit is configured to allow the content to be provided to all groups when the control unit receives instructions from a user having superuser privileges of the apparatus.

(10) The apparatus of any one of (3) to (5), (8) or (9), wherein the managing unit is configured to:

associate an object created by the first external devices with the first group; and render the object accessible by second external device.

(11) The apparatus of (3) or (10), wherein the managing unit is configured to map, upon receiving object information, the object information to an predetermined object table, the object information comprising objects and information relating to the creators of the objects, wherein the managing unit is configured to associate the objects with the one or more groups, based on the information relating to the creators of the objects.

(12) The apparatus of any one of (3) to (5) or (8) to (10), wherein the managing unit is configured to:

map the external devices to a predetermined device-group table indicating a group to which each of the external devices belongs, based on the UPnP descriptions;

store the device-group table in a storage medium; and identify members belonging to the same group, based on the device-group table.

(13) The apparatus of (3) or (12), wherein the managing unit is configured to: map the external devices to a predetermined device table based on the UPnP descriptions, the device table comprising at least one of a device identifier, a Universally Unique Identifier, a device name, or an IP address of the first device; and associate information of the device table with information of the device-group table, based on the device identifier.

(14) The apparatus of any one of (1) to (3), (6) or (7), wherein the UPnP descriptions are received after the apparatus multicasts search messages over a network, to search the external devices.

(15) The apparatus of (14), wherein the external devices send Uniform Resource Locater (URL) messages to the apparatus, in response to the search message.

(16) The apparatus of any one of (1) to (3), (6), (7) or (14), wherein the UPnP descriptions are received after the external devices multicast a discovery message to find the apparatus.

(17) The apparatus of (16), wherein the apparatus sends a Uniform Resource Locater (URL) message to the external devices, in response to the discovery message.

(18) The apparatus of any one of (1) to (3), (6), (7), (14) or (16), wherein the UPnP descriptions comprise a tag, and the grouping information is contained in the tag.

(19) The apparatus of any one of (1) to (3), (6), (7), (14), (16) or (18), further comprising:
a storage medium configured to store a plurality of content to be rendered by the external devices; and
a control unit configured to control whether to allow the content be rendered by the external devices.

(20) The apparatus of (19), wherein the content comprises image content, audio content, video content, or text content, processed by the external devices.

(21) The apparatus of any one of (1) to (3), (6), (7), (14), (16), (18) or (19), further comprising a communication unit configured to communicate with the external devices.

(22) The apparatus of any one of (1) to (3), (6), (7), (14), (16), (18), (19) or (21), wherein the processing unit is configured to assign the apparatus to one of the groups.

(23) The apparatus of any one of (1) to (3), (6), (7), (14), (16), (18), (19), (21) or (22), further comprising a setting unit configured to allow a user of the apparatus to set grouping information for the apparatus.

(24) A terminal device comprising:
a user interface unit configured to receive a user input indicating a group to which the terminal device belongs;
a group setting unit configured to generate a Universal Plug and Play (UPnP) description comprising grouping information indicating the group to which the terminal device belongs;
a storage unit configured to store the UPnP description; and
a transmission unit configured to transmit the UPnP description to a group registration device.

(25) The device of (24), further comprising a processing unit configured to process content,
wherein the transmission unit is configured to transmit the content to the group registration device after the device receives a group registration notice from the group registration device.

(26) The device of (25), wherein the transmission of the content from the device triggers a notification of content creation or modification from the group registration device to at least an external device being in the same group as the device.

(27) The device of (24) or (25), further comprising:
a receiver unit configured to receive, from the group registration device, a first notification of group assignment information, and a second notification of content created or modified by an external device being in the same group as the device; and
a rendering unit configured to render the content.

(28) The device of (27), further comprising a processing unit configured to notify a user of the device of the second notification.

(29) A system comprising:
a terminal device, comprising:
a user interface unit configured to receive a user input indicating a group to which the terminal device belongs;
a group setting unit configured to generate a Universal Plug and Play (UPnP) description comprising grouping information indicating the group to which the terminal device belongs;
a storage unit configured to store the UPnP description; and
a transmission unit configured to transmit the UPnP description to an information processing device; and
the information processing device, comprising:
an input terminal configured to receive the UPnP description from the terminal device; and
a processing unit configured to:
process the UPnP description; and
assign the terminal device to the group based on the grouping information.

(30) A method performed by an information processing apparatus, the method comprising:
receiving a plurality of Universal Plug and Play (UPnP) descriptions from a plurality of external devices, the UPnP descriptions comprising grouping information indicating one or more groups to which the external devices belong; and
assigning the external devices to the one or more groups based on the grouping information.

(31) A method performed by a terminal device, the method comprising:
receiving a user input indicating a group to which the terminal device belongs;
generating a Universal Plug and Play (UPnP) description comprising grouping information indicating the group to which the terminal device belongs;
storing the UPnP description; and
transmitting the UPnP description to a group registration device.

REFERENCE SIGNS LIST

100 Information processing device
110 Communication unit
120 User interface unit
130 Storage unit
160 Grouping unit
170 Content management unit
180 Access control unit
200 Terminal device
210 Communication unit
220 User interface unit
230 Storage unit
240 Device description
250 Service description
260 Group setting unit
270 Content processing unit

The invention claimed is:
1. An information processing apparatus comprising:
an input terminal configured to receive a plurality of device descriptions from a plurality of external devices, using a uniform resource locator (URL) included in a response message received from each of the plurality of external devices, the plurality of device descriptions comprising one or more group identifiers indicating one or more groups to which the plurality of external devices belong,
wherein the response message is received from each of the plurality of external devices in response to a search message which is multicast by the information processing apparatus in a network; and
a processing unit configured to:
process the plurality of device descriptions; and
assign the plurality of external devices to the one or more groups based on the one or more group identifiers.

2. The information processing apparatus according to claim 1, wherein:
the plurality of device descriptions further comprise a plurality of device identifiers corresponding to the plurality of external devices; and
the processing unit is configured to assign the plurality of external devices to the one or more groups based on the plurality of device identifiers.

3. The information processing apparatus according to claim 1, wherein the processing unit is configured to assign a first external device and a second external device of the plurality of external devices, to a first group, and the information processing apparatus further comprises a managing unit configured to:
receive, from the first external device, a notification indicating one of a creation or a modification of content by the first external device;
generate an event message indicating the notification; and
supply the event message to the second external device.

4. The information processing apparatus according to claim 3, further comprising a storage medium, wherein the managing unit is configured to:
determine whether the storage medium includes a container assigned to the first group;
assign a new container to the first group if container is not assigned to the first group; and
store the content indicated by the notification.

5. The information processing apparatus according to claim 3, wherein the managing unit is configured to:
register the first external device and the second external device as event subscribers within the first group; and
notify the event subscribers of an event related to the content, using an event notification function of an internet protocol corresponding to the plurality of device descriptions.

6. The information processing apparatus according to claim 3, further comprising a control unit configured to approve a request, from a third external device, for access to the content of the first group if the third external device is assigned to the first group.

7. The information processing apparatus according to claim 1, wherein the control unit is configured to allow access of the content to all groups in case the control unit receives instructions from a user having superuser privileges of the information processing apparatus.

8. The information processing apparatus according to claim 3, wherein the managing unit is configured to:
map an object created by the first external device with the first group; and
render the object accessible by the second external device.

9. The information processing apparatus according to claim 8, wherein the managing unit is configured to map, upon receiving object information, the object information to a predetermined object table, the object information comprising objects and information relating to the creators of the objects,
wherein the managing unit is configured to map the objects with the one or more groups, based on the information relating to the creators of the objects.

10. The information processing apparatus according to claim 3, wherein the managing unit is configured to:
map the plurality of external devices to a predetermined device-group table indicating a group to which each of the plurality of external devices belongs, based on the plurality of device descriptions;
store the predetermined device-group table in a storage medium; and
identify members belonging to the same group, based on the predetermined device-group table.

11. The information processing apparatus according to claim 10, wherein the managing unit is configured to:
map the plurality of external devices to a predetermined device table based on the plurality of device descriptions, the predetermined device table comprising at least one of a device identifier, a Universally Unique Identifier, a device name, or an IP address of the first external device; and
map information of the predetermined device table with information of the predetermined device-group table, based on the device identifier.

12. The information processing apparatus according to claim 1, further comprising:
a storage medium configured to store content to be rendered by the plurality of external devices; and
a control unit configured to control whether to allow access of the content to be rendered by the plurality of external devices.

13. The information processing apparatus according to claim 12, wherein the content comprises at least one of image content, audio content, video content, or text content, processed by the plurality of external devices.

14. A terminal device comprising:
a user interface unit configured to receive a user input and set a group, to which the terminal device belongs, based on the user input;
a group setting unit configured to generate a device description comprising a group identifier indicating the group to which the terminal device belongs;
a storage unit configured to store the device description; and
a transmission unit configured to transmit a response message including a uniform resource locator (URL) of the device description to a group registration device,
wherein the response message is transmitted to the group registration device in response to a search message which is multicast by the group registration device in a network.

15. The terminal device according to claim 14, further comprising a processing unit configured to process content,
wherein the transmission unit is configured to transmit the content to the group registration device after the terminal device receives a group registration notice from the group registration device.

16. The terminal device according to claim 15, wherein the transmission of the content from the terminal device triggers a notification of content creation or modification from the group registration device to at least an external device being in the same group as the terminal device.

17. The terminal device according to claim 14, further comprising:
a receiver unit configured to receive, from the group registration device, a first notification of group assignment information, and a second notification of content created or modified by an external device being in the same group as the terminal device; and a rendering unit configured to render the content.

18. A system comprising:

a terminal device, comprising:

a user interface unit configured to receive a user input and set a group, to which the terminal device belongs, based on the user input;

a group setting unit configured to generate a device description comprising a group identifier indicating the group to which the terminal device belongs;

a storage unit configured to store the device description; and a transmission unit configured to transmit the device description to an information processing device; and the information processing device, comprising:

an input terminal configured to receive the device description from the terminal device, using a uniform resource locator (URL) included in a response message received from the terminal device, wherein the response message is received from the terminal device in response to a search message which is multicast by the information processing device in a network; and a processing unit configured to:

process the device description; and assign the terminal device to the group based on the group identifier.

19. A method performed by an information processing apparatus, the method comprising:

receiving a plurality of device descriptions from a plurality of external devices, using a uniform resource locator (URL) included in a response message received from each of the plurality of external devices, the plurality of device descriptions comprising one or more group identifiers indicating one or more groups to which the plurality of external devices belong, wherein the response message is received from each of the plurality of external devices in response to a search message which is multicast by the information processing apparatus in a network; and assigning the plurality of external devices to the one or more groups based on the one or more group identifiers.

20. A method performed by a terminal device, the method comprising:

receiving a user input and setting a group, to which the terminal device belongs, based on the user input;

generating a device description comprising a group identifier indicating the group to which the terminal device belongs;

storing the device description; and transmitting a response message including a uniform resource locator (URL) of the device description to a group registration device, wherein the response message is transmitted to the group registration device in response to a search message which is multicast by the group registration device in a network.

* * * * *